United States Patent
Patel et al.

(10) Patent No.: US 11,328,071 B2
(45) Date of Patent: May 10, 2022

(54) METHOD AND SYSTEM FOR IDENTIFYING ACTOR OF A FRAUDULENT ACTION DURING LEGAL HOLD AND LITIGATION

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: DELL PRODUCTS L.P., Hopkinton, MA (US)

(*) Notice: Subject to any disclaimer, the term of this patent is extended or adjusted under 35 U.S.C. 154(b) by 405 days.

(21) Appl. No.: 16/528,618

(22) Filed: Jul. 31, 2019

(65) Prior Publication Data
US 2021/0034766 A1 Feb. 4, 2021

(51) Int. Cl.
*G06F 21/60* (2013.01)
*G06F 21/64* (2013.01)
*G06Q 50/18* (2012.01)
*G06Q 50/26* (2012.01)
*G06F 21/62* (2013.01)

(52) U.S. Cl.
CPC ........ *G06F 21/604* (2013.01); *G06F 21/6227* (2013.01); *G06F 21/64* (2013.01); *G06Q 50/18* (2013.01); *G06Q 50/26* (2013.01)

(58) Field of Classification Search
CPC .................................................... G06F 21/604
See application file for complete search history.

(56) References Cited

U.S. PATENT DOCUMENTS

| | | | |
|---|---|---|---|
| 4,780,809 | A | 10/1988 | Woffinden |
| 5,689,678 | A | 11/1997 | Stallmo et al. |
| 6,098,098 | A | 8/2000 | Sandahl et al. |
| 6,223,252 | B1 | 4/2001 | Bandera et al. |
| 6,516,425 | B1 | 2/2003 | Belhadj et al. |

(Continued)

OTHER PUBLICATIONS

Suzhen Wu et al. ;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028).

(Continued)

*Primary Examiner* — Bradley W Holder
(74) *Attorney, Agent, or Firm* — Chamberlain, Hrdlicka, White, Williams & Aughtry

(57) ABSTRACT

A method includes obtaining data from a host, wherein the data is associated with an object and a user, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, generating an object entry based on the deduplicated data chunks and the at least one parity chunk, storing the storage metadata and the object entry in an accelerator pool, storing, across a plurality of fault domains, the plurality of deduplicated data chunks and the at least one parity chunk, and initiating storage metadata distribution on the storage metadata and the object entry across the plurality of fault domains.

20 Claims, 13 Drawing Sheets

(56) References Cited

U.S. PATENT DOCUMENTS

| | | | |
|---|---|---|---|
| 7,636,814 B1 | 12/2009 | Karr | |
| 7,882,386 B1 | 2/2011 | Potnis et al. | |
| 7,987,353 B2 | 7/2011 | Holdaway et al. | |
| 8,037,345 B1 | 10/2011 | Iyer et al. | |
| 8,099,571 B1* | 1/2012 | Driscoll | G06F 3/0613 |
| | | | 711/162 |
| 8,161,255 B2 | 4/2012 | Anglin et al. | |
| 8,190,835 B1 | 5/2012 | Yueh | |
| 8,364,917 B2 | 1/2013 | Bricker et al. | |
| 8,386,930 B2 | 2/2013 | Dillenberger et al. | |
| 8,583,769 B1 | 11/2013 | Peters et al. | |
| 8,788,466 B2 | 7/2014 | Anglin et al. | |
| 8,868,987 B2 | 10/2014 | Wagner | |
| 8,874,892 B1 | 10/2014 | Chan et al. | |
| 8,898,114 B1 | 11/2014 | Feathergill et al. | |
| 8,949,208 B1 | 2/2015 | Xu et al. | |
| 9,122,501 B1 | 9/2015 | Hsu et al. | |
| 9,201,751 B1 | 12/2015 | Muthirisavenugopal et al. | |
| 9,256,378 B2* | 2/2016 | Zheng | G06F 3/0683 |
| 9,256,381 B1 | 2/2016 | Fultz et al. | |
| 9,278,481 B2 | 3/2016 | Hull | |
| 9,355,036 B2 | 5/2016 | Beard et al. | |
| 9,521,198 B1 | 12/2016 | Agarwala et al. | |
| 9,696,939 B1* | 7/2017 | Frank | G06F 11/1471 |
| 9,710,367 B1 | 7/2017 | Nagineni | |
| 9,749,480 B1 | 8/2017 | Katano | |
| 9,792,316 B1* | 10/2017 | Cremelie | G06F 11/1453 |
| 9,830,111 B1 | 11/2017 | Patiejunas et al. | |
| 9,898,224 B1 | 2/2018 | Marshak et al. | |
| 10,002,048 B2 | 6/2018 | Chennamsetty et al. | |
| 10,013,323 B1 | 7/2018 | Puhov et al. | |
| 10,013,325 B1 | 7/2018 | Garrett, Jr. et al. | |
| 10,031,672 B2 | 7/2018 | Wang et al. | |
| 10,057,184 B1 | 8/2018 | Prahlad et al. | |
| 10,091,295 B1 | 10/2018 | Savic et al. | |
| 10,097,620 B2 | 10/2018 | Reddy et al. | |
| 10,152,254 B1 | 12/2018 | Kang et al. | |
| 10,185,624 B2 | 1/2019 | Akutsu | |
| 10,241,695 B2 | 3/2019 | Baptist | |
| 10,339,455 B1 | 7/2019 | Parush-Tzur et al. | |
| 10,409,778 B1 | 9/2019 | Zhao et al. | |
| 10,452,301 B1 | 10/2019 | Farhan | |
| 10,503,413 B1 | 12/2019 | Gal et al. | |
| 10,503,611 B1 | 12/2019 | Srivastav | |
| 10,528,429 B1 | 1/2020 | Vempati et al. | |
| 10,817,392 B1 | 10/2020 | Mcauliffe et al. | |
| 10,929,256 B2 | 2/2021 | Danilov et al. | |
| 10,956,601 B2 | 3/2021 | Surla et al. | |
| 10,963,345 B2 | 3/2021 | Patel et al. | |
| 10,990,480 B1 | 4/2021 | Bernat et al. | |
| 11,005,468 B1 | 5/2021 | Subramanian et al. | |
| 11,112,990 B1 | 9/2021 | Bernat et al. | |
| 2001/0044879 A1 | 11/2001 | Moulton | |
| 2003/0036882 A1 | 2/2003 | Harper et al. | |
| 2003/0058277 A1 | 3/2003 | Bowman-Amuah | |
| 2003/0065873 A1 | 4/2003 | Collins et al. | |
| 2003/0172145 A1 | 9/2003 | Nguyen | |
| 2003/0177205 A1 | 9/2003 | Liang et al. | |
| 2004/0128587 A1 | 7/2004 | Kenchammana-hosekote | |
| 2004/0153844 A1 | 8/2004 | Ghose et al. | |
| 2004/0260967 A1 | 12/2004 | Guha et al. | |
| 2005/0076049 A1 | 4/2005 | Qubti et al. | |
| 2005/0086557 A1 | 4/2005 | Sato et al. | |
| 2005/0182797 A1 | 8/2005 | Adkins et al. | |
| 2005/0262385 A1 | 11/2005 | Mcneill, Jr. et al. | |
| 2005/0283655 A1 | 12/2005 | Ashmore | |
| 2007/0214255 A1 | 9/2007 | Spitz et al. | |
| 2007/0283011 A1 | 12/2007 | Rakowski et al. | |
| 2008/0244204 A1 | 10/2008 | Cremelie et al. | |
| 2008/0282105 A1 | 11/2008 | Deenadhayalan et al. | |
| 2009/0077165 A1 | 3/2009 | Rhodes et al. | |
| 2009/0094250 A1 | 4/2009 | Dhuse | |
| 2009/0235022 A1 | 9/2009 | Bates et al. | |
| 2009/0254572 A1 | 10/2009 | Redlich et al. | |
| 2009/0265360 A1 | 10/2009 | Bachwani | |
| 2010/0061207 A1 | 3/2010 | Trantham |
| 2010/0138604 A1 | 6/2010 | Noguchi et al. |
| 2010/0241616 A1 | 9/2010 | Murphy et al. |
| 2011/0099351 A1 | 4/2011 | Condict |
| 2011/0173484 A1 | 7/2011 | Schuette et al. |
| 2011/0197024 A1 | 8/2011 | Thomas |
| 2011/0246597 A1 | 10/2011 | Swanson et al. |
| 2011/0302446 A1 | 12/2011 | Becker-szendy et al. |
| 2012/0096309 A1 | 4/2012 | Kumar et al. |
| 2013/0047029 A1 | 2/2013 | Ikeuchi et al. |
| 2013/0067459 A1 | 3/2013 | Sannidhanam et al. |
| 2013/0086006 A1 | 4/2013 | Colgrove |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0032834 A1 | 1/2014 | Cudak et al. |
| 2014/0059311 A1 | 2/2014 | Oberhofer et al. |
| 2014/0089265 A1 | 3/2014 | Talagala et al. |
| 2014/0089630 A1 | 3/2014 | Pignatelli |
| 2014/0285917 A1 | 9/2014 | Cudak et al. |
| 2014/0297603 A1 | 10/2014 | Kim et al. |
| 2015/0012775 A1 | 1/2015 | Cudak et al. |
| 2015/0046756 A1 | 2/2015 | Sreekumaran et al. |
| 2015/0058582 A1 | 2/2015 | Baldwin et al. |
| 2015/0095596 A1 | 4/2015 | Yang |
| 2015/0161000 A1 | 6/2015 | Kim et al. |
| 2015/0205657 A1 | 7/2015 | Clark |
| 2015/0205669 A1 | 7/2015 | Sundaram et al. |
| 2015/0220400 A1 | 8/2015 | Resch |
| 2015/0227602 A1 | 8/2015 | Ramu et al. |
| 2015/0286545 A1 | 10/2015 | Brown |
| 2015/0355980 A1 | 12/2015 | Volvovski |
| 2015/0379430 A1 | 12/2015 | Dirac et al. |
| 2016/0013988 A1 | 1/2016 | Andrews |
| 2016/0057226 A1 | 2/2016 | Bestler et al. |
| 2016/0062674 A1 | 3/2016 | Benight et al. |
| 2016/0070652 A1 | 3/2016 | Sundararaman et al. |
| 2016/0077933 A1 | 3/2016 | Ventura et al. |
| 2016/0085630 A1 | 3/2016 | Gardner |
| 2016/0170871 A1 | 6/2016 | Hyun et al. |
| 2016/0246537 A1 | 8/2016 | Kim |
| 2016/0313916 A1 | 10/2016 | Sivananainthaperumal et al. |
| 2016/0334998 A1 | 11/2016 | George et al. |
| 2017/0031761 A1 | 2/2017 | Horan et al. |
| 2017/0090767 A1 | 3/2017 | Poston et al. |
| 2017/0099187 A1 | 4/2017 | Dale et al. |
| 2017/0147437 A1 | 5/2017 | Borlick et al. |
| 2017/0160983 A1 | 6/2017 | Fiske et al. |
| 2017/0192865 A1 | 7/2017 | Pan |
| 2017/0192868 A1 | 7/2017 | Vijayan et al. |
| 2017/0206034 A1 | 7/2017 | Fetik |
| 2017/0235609 A1 | 8/2017 | Wires et al. |
| 2017/0262185 A1 | 9/2017 | Long et al. |
| 2017/0308536 A1 | 10/2017 | Azzam et al. |
| 2018/0018227 A1 | 1/2018 | Kazi |
| 2018/0018235 A1 | 1/2018 | Arslan |
| 2018/0060894 A1 | 3/2018 | Beveridge et al. |
| 2018/0157532 A1 | 6/2018 | Kumar et al. |
| 2018/0165169 A1 | 6/2018 | Camp et al. |
| 2018/0189109 A1 | 7/2018 | Nagai et al. |
| 2018/0217898 A1 | 8/2018 | Tormasov |
| 2018/0260123 A1 | 9/2018 | Andresen et al. |
| 2018/0278597 A1 | 9/2018 | Helms et al. |
| 2018/0284987 A1 | 10/2018 | Lazier |
| 2018/0307560 A1 | 10/2018 | Vishnumolakala et al. |
| 2018/0314607 A1 | 11/2018 | Deshpande et al. |
| 2018/0322558 A1 | 11/2018 | Padmanabh et al. |
| 2018/0356998 A1 | 12/2018 | Wu et al. |
| 2019/0050263 A1 | 2/2019 | Patel et al. |
| 2019/0104398 A1 | 4/2019 | Owen et al. |
| 2019/0108099 A1 | 4/2019 | Mazumdar |
| 2019/0109772 A1 | 4/2019 | Lipstone et al. |
| 2019/0197023 A1 | 6/2019 | Chennamsetty et al. |
| 2019/0332473 A1 | 10/2019 | Yang et al. |
| 2019/0332502 A1 | 10/2019 | Ma et al. |
| 2019/0361850 A1 | 11/2019 | Uno et al. |
| 2019/0379588 A1 | 12/2019 | Rao |
| 2020/0026439 A1 | 1/2020 | Gao et al. |
| 2020/0034257 A1 | 1/2020 | Mahmood et al. |

(56) References Cited

U.S. PATENT DOCUMENTS

| | | |
|---|---|---|
| 2020/0042388 A1 | 2/2020 | Roberts |
| 2020/0050689 A1 | 2/2020 | Tal et al. |
| 2020/0065191 A1 | 2/2020 | Zhou |
| 2020/0133503 A1 | 4/2020 | Sun et al. |
| 2020/0175038 A1 | 6/2020 | Guan et al. |
| 2020/0201837 A1 | 6/2020 | Motwani et al. |
| 2020/0257457 A1 | 8/2020 | Matsugami et al. |

OTHER PUBLICATIONS

"Features—RoboHead"; Project Management Software for Marketing & Creative Teams, Aquent; 2018 (https://www.robohead.net/features).

"Make more time for the work that matters most"; Asana, Inc.; 2017 (https://asana.com/).

"Online Project Management Tools & Features"; ProWorkflow; Jun. 2015 (https://www.proworkflow.com/features-project-management-tools/).

Extended European Search Report issued in corresponding European Application No. 20152195.2, dated Jun. 2, 2020.

\* cited by examiner

US 11,328,071 B2

METHOD AND SYSTEM FOR IDENTIFYING ACTOR OF A FRAUDULENT ACTION DURING LEGAL HOLD AND LITIGATION

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate and store data may impact the overall performance of the computing resources.

SUMMARY

In general, in one aspect, the invention relates to a method for managing data. The method includes obtaining data from a host, wherein the data is associated with an object and a user, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, generating an object entry based on the deduplicated data chunks and the at least one parity chunk, wherein the object entry specifies at least the user and authorization information associated with the object for at least the user, storing the storage metadata and the object entry in an accelerator pool, storing, across a plurality of fault domains, the plurality of deduplicated data chunks and the at least one parity chunk, and initiating storage metadata distribution on the storage metadata and the object entry across the plurality of fault domains.

In general, in one aspect, the invention relates to a non-transitory computer readable medium which includes computer readable program code, which when executed by a computer processor enables the computer processor to perform a method for managing data. The method includes obtaining data from a host, wherein the data is associated with an object and a user, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, generating an object entry based on the deduplicated data chunks and the at least one parity chunk, wherein the object entry specifies at least the user and authorization information associated with the object for at least the user, storing the storage metadata and the object entry in an accelerator pool, storing, across a plurality of fault domains, the plurality of deduplicated data chunks and the at least one parity chunk, and initiating storage metadata distribution on the storage metadata and the object entry across the plurality of fault domains.

In general, in one aspect, the invention relates to a data cluster that includes a host, an accelerator pool that includes a plurality of data nodes, wherein a data node of the plurality of data nodes includes a processor and memory that includes instructions, which when executed by the processor perform a method for managing data. The method includes obtaining data from the host, wherein the data is associated with an object and a user, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, generating an object entry based on the deduplicated data chunks and the at least one parity chunk, wherein the object entry specifies at least the user and authorization information associated with the object for at least the user, storing the storage metadata and the object entry in the accelerator pool, storing, across a plurality of fault domains, the plurality of deduplicated data chunks and the at least one parity chunk, and initiating storage metadata distribution on the storage metadata and the object entry across the plurality of fault domains.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
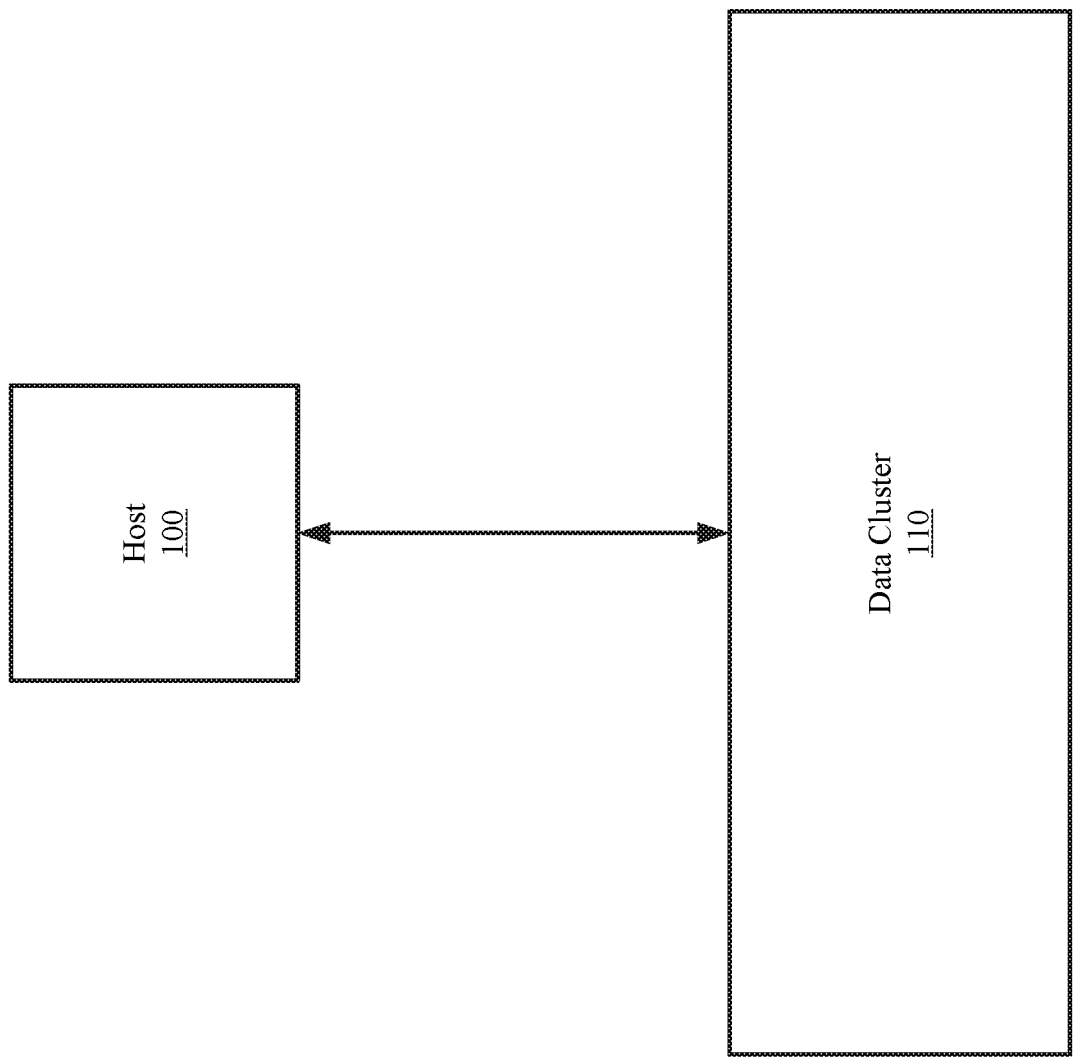
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data and metadata in a data cluster. Embodiments of the invention may utilize a data processor, operating in an accelerator pool, which applies an erasure coding procedure on data obtained from a host to divide the data into data chunks and to generate parity chunks using the data chunks. The data processor may then perform deduplication on the data chunks to generate deduplicated data that includes deduplicated data chunks. The deduplicated data chunks and the parity chunks are subsequently distributed to nodes in the data cluster in accordance with an erasure coding procedure.

In one or more embodiments of the invention, the accelerator pool stores storage metadata that specifies the nodes in which each data chunk and parity chunk is stored and object metadata that specifies an object associated with each data chunk. The storage metadata and object metadata may also be distributed to nodes in the non-accelerator pool. In this manner, if the storage metadata or object metadata stored in the accelerator pool becomes unavailable, the storage metadata and/or the object metadata may be reconstructed using the storage metadata stored in the non-accelerator pool.

In one or more embodiments of the invention, the object metadata further specifies authorization information associated with the object. The authorization information may be used to determine whether an entity has permission (or access) to read, write, and/or otherwise modify the object. For example, if a litigation request is obtained, an authorization manager may modify the authorization information of an object until the litigation request is serviced (i.e., the litigation hold is no longer in effect).

FIG. 1A shows an example system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be backups of databases, files, applications, and/or other types of data without departing from the invention.

Figure 5:
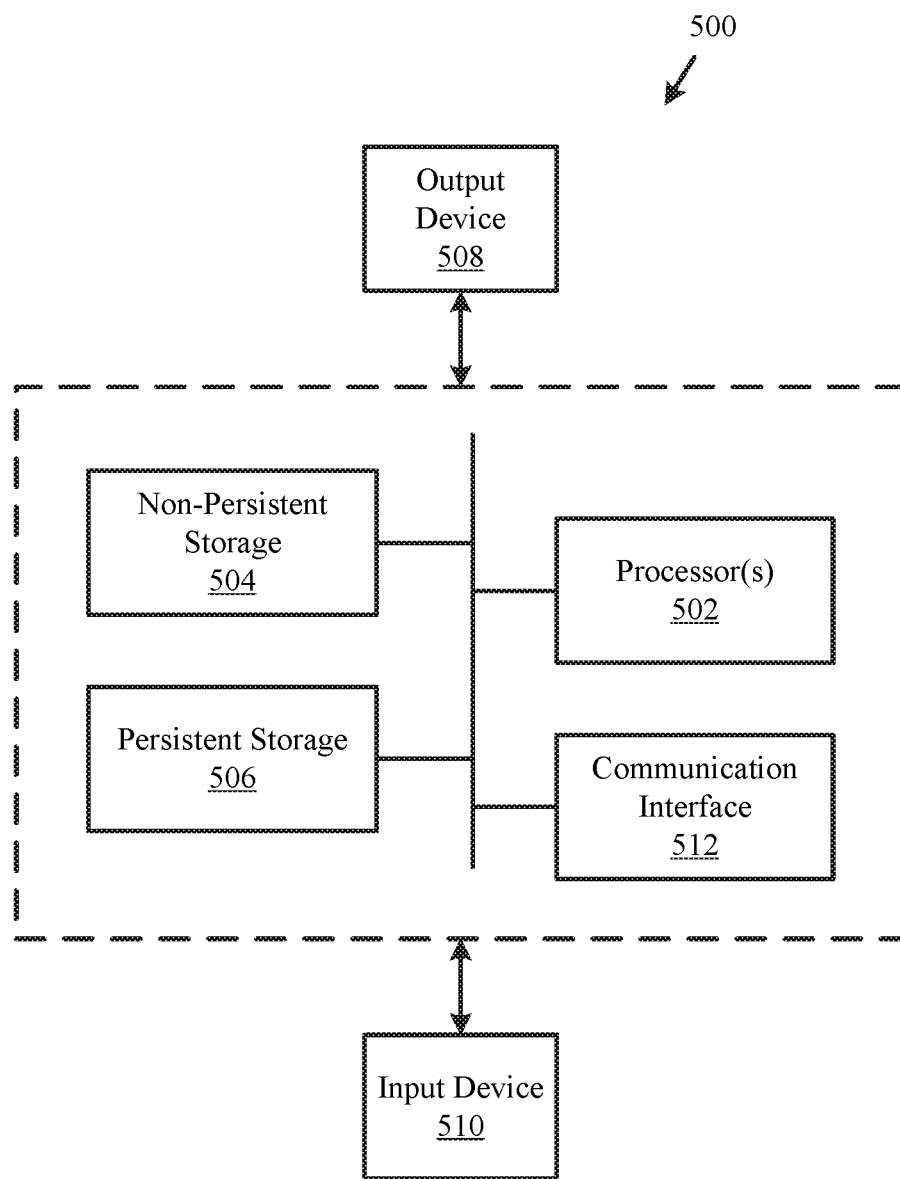
FIG. 5 shows a diagram of a computing device in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data, metadata, and/or backups of data generated by the host (100). The data and/or backups may be deduplicated versions of data obtained from the host. The data cluster may, via an erasure coding procedure, store portions of the data (which may or may not be deduplicated) across nodes operating in the data cluster (110).

As used herein, deduplication refers to methods of storing only portions (also referred to as file segments or segments) of files (which are a type of object) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be deduplicated before being stored in the persistent storage resulting in much less storage space of the persistent storage being required to store the subsequently stored versions when compared to the amount of storage space of the persistent storage required to store the first stored version.

Continuing with the discussion of FIG. 1A, the data cluster (110) may include nodes that each store any number of portions of data. The portions of data may be obtained by other nodes or obtained from the host (100). For additional details regarding the data cluster (110), see, e.g., FIG. 1B.

Figure 1B:
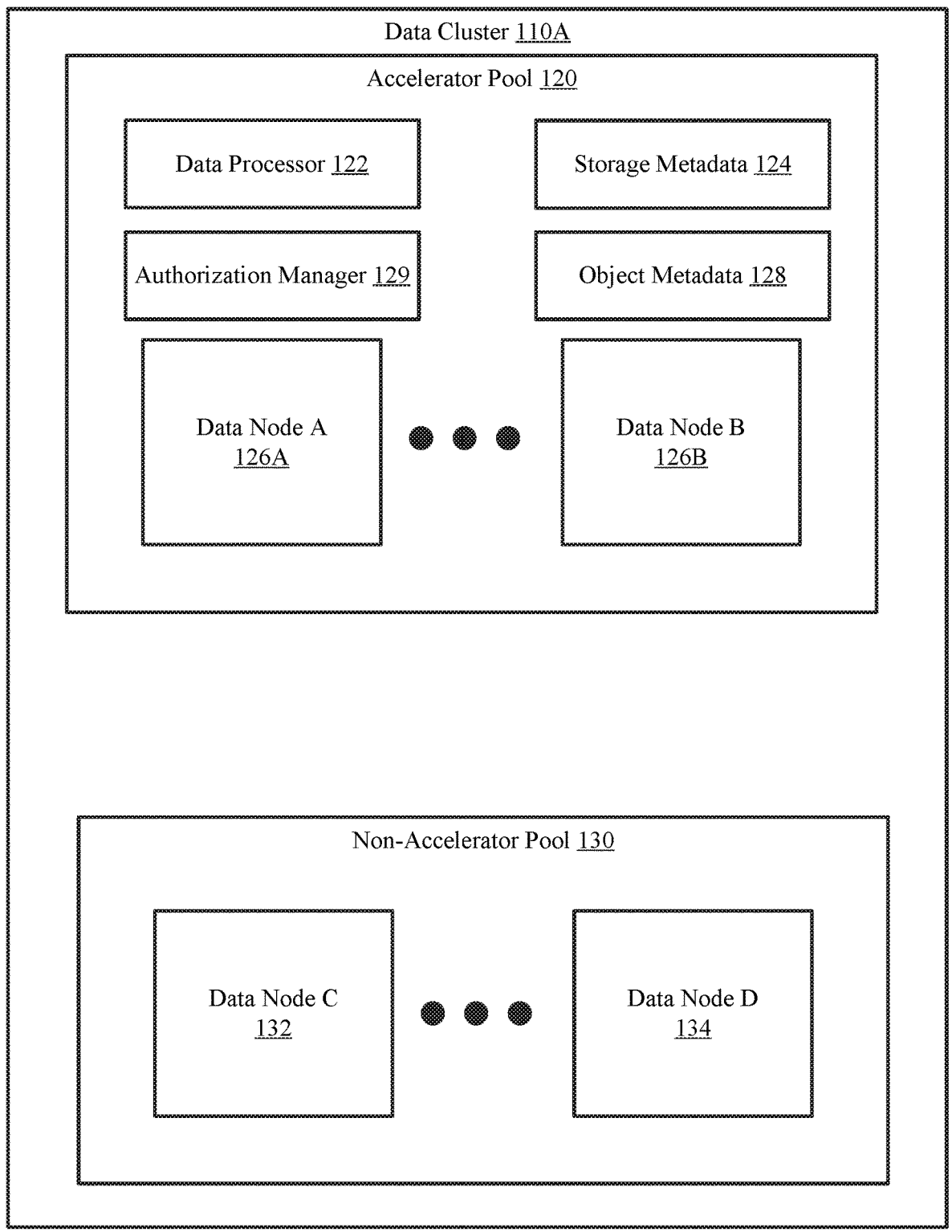
FIG. 1B shows a diagram of a data cluster in accordance with one or more embodiments of the invention.

FIG. 1B shows a diagram of a data cluster (110A) in accordance with one or more embodiments of the invention. The data cluster (110A) may be an embodiment of the data cluster (110, FIG. 1A) discussed above. The data cluster (110A) may include an accelerator pool (120) and a non-accelerator pool (130). The accelerator pool (120) may include a data processor (122), an authorization manager (129), storage metadata (124), object metadata (128) and any number of data nodes (126A, 126B). Similarly, the non-accelerator pool (130) includes any number of data nodes (132, 134). The components of the data cluster (110A) may be operably connected via any combination of wired and/or wireless connections. Each of the aforementioned components is discussed below.

In one or more embodiments of the invention, the data processor (122) is a device that includes functionality to perform deduplication on data obtained from a host (e.g., 100, FIG. 1A). The data processor (122) may generate, utilize, and update storage metadata (124) (as described in FIG. 2A) as part of its deduplication functionality. In one or more embodiments of the invention, the storage metadata (124) is a data structure that stores unique identifiers of portions data stored in the data cluster (110A). The unique identifiers stored in the storage metadata (124) may be used to determine whether a data chunk of the obtained data is already present elsewhere in the accelerator pool (120) or the non-accelerator pool (130). The data processor (122) may use the storage information to perform the deduplication and generate deduplicated data. The data processor (122) may perform the deduplication and/or erasure coding procedure via the method illustrated in FIG. 3A.

In one or more embodiments of the invention, the storage metadata (124) is stored in a data node (126A, 126B) of the accelerator pool (120). A copy of the storage metadata (124) may be distributed to one or more data nodes (132, 134) of the non-accelerator pool (130). In this manner, if the storage metadata (124) stored in the accelerator pool (120) experiences a failure (e.g., it becomes unavailable, corrupted, etc.), the storage metadata (124) may be reconstructed using the copies of storage metadata stored in the non-accelerator pool (130). For additional detail regarding the distribution on storage metadata, see e.g., FIG. 3A.

In one or more embodiments of the invention, the data processor (122) updates object metadata (128) after storing data chunks (which may be deduplicated) and parity chunks. In one or more embodiments of the invention, the object metadata is a data structure, stored in a computing device (e.g., a data node (126A, 126B)) of the accelerator pool (120), includes object information about the data stored in the data cluster (110A). An object may be, for example, a file, a set of files, a portion of a file, a backup of any combination thereof, and/or any other type of data without departing from the invention. For additional details regarding the object metadata, see, e.g., FIG. 2B.

Figure 3A:
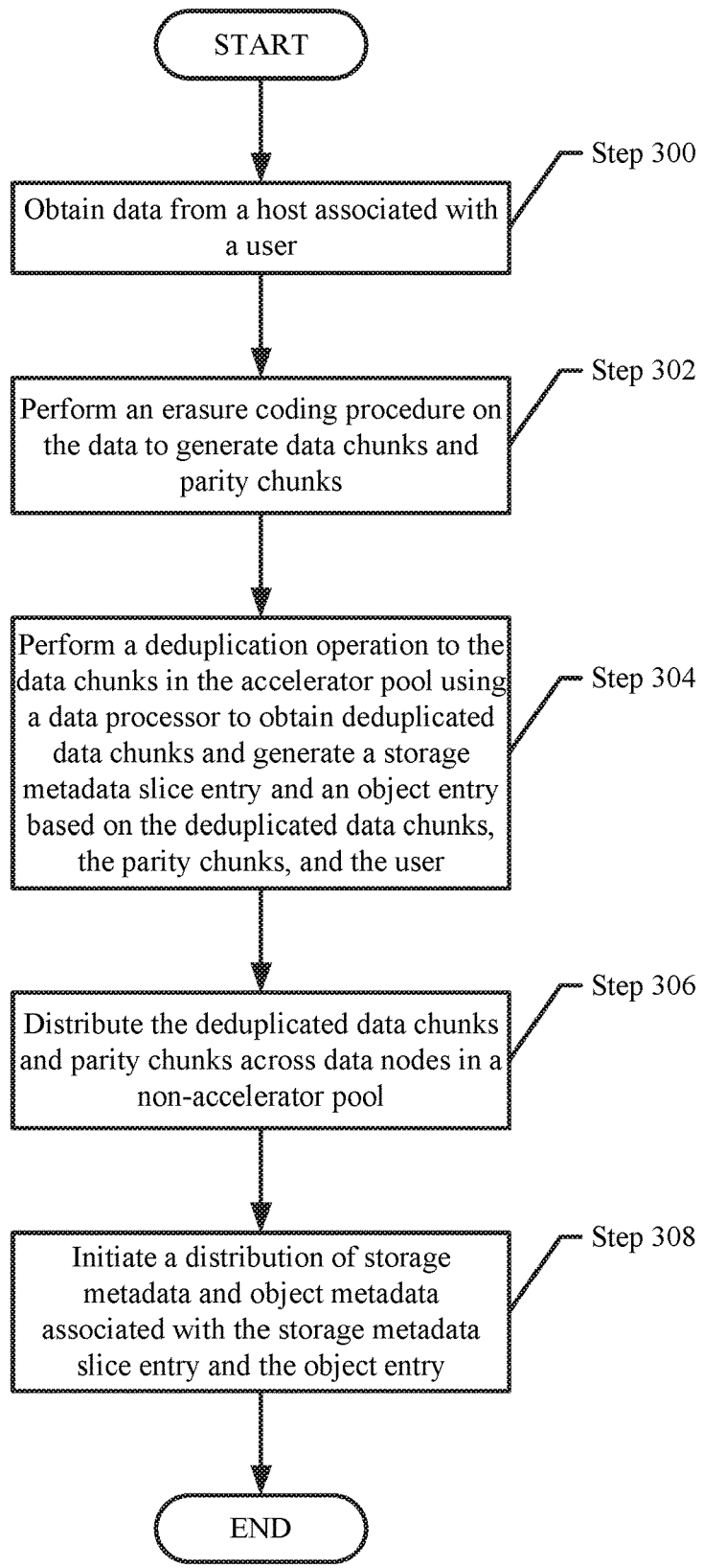
FIG. 3A shows a flowchart for storing data in a data cluster in accordance with one or more embodiments of the invention.

In one or more of embodiments of the invention, the data processor (122) is implemented as computer instructions, e.g., computer code, stored on a persistent storage that when executed by a processor of a data node (e.g., 126A, 126B) of the accelerator pool (120) cause the data node to provide the aforementioned functionality of the data processor (122) described throughout this application and/or all, or a portion thereof, of the method illustrated in FIG. 3A.

In one or more embodiments of the invention, the data processor (122) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (122) described throughout this application and/or all, or a portion thereof, of the method illustrated in FIG. 3A.

In one or more embodiments of the invention, the data processor (122) is implemented as a logical device. The logical device may utilize the computing resources of any number of computing devices and thereby provide the functionality of the data processor (122) described throughout this application and/or all, or a portion thereof, of the method illustrated in FIG. 3A.

In one or more embodiments of the invention, the authorization manager (129) manages the authorization information of objects specified in the object metadata (128). The authorization manager (129) may, for example, modify object entries of the object metadata (128) in accordance with requests sent by a host, or other entity, to allow a user to access and/or modify the object. The authorization manager may further be programmed to delete object entries and/or data associated with deleted object entries in accordance with deletion requests.

Figure 3C:
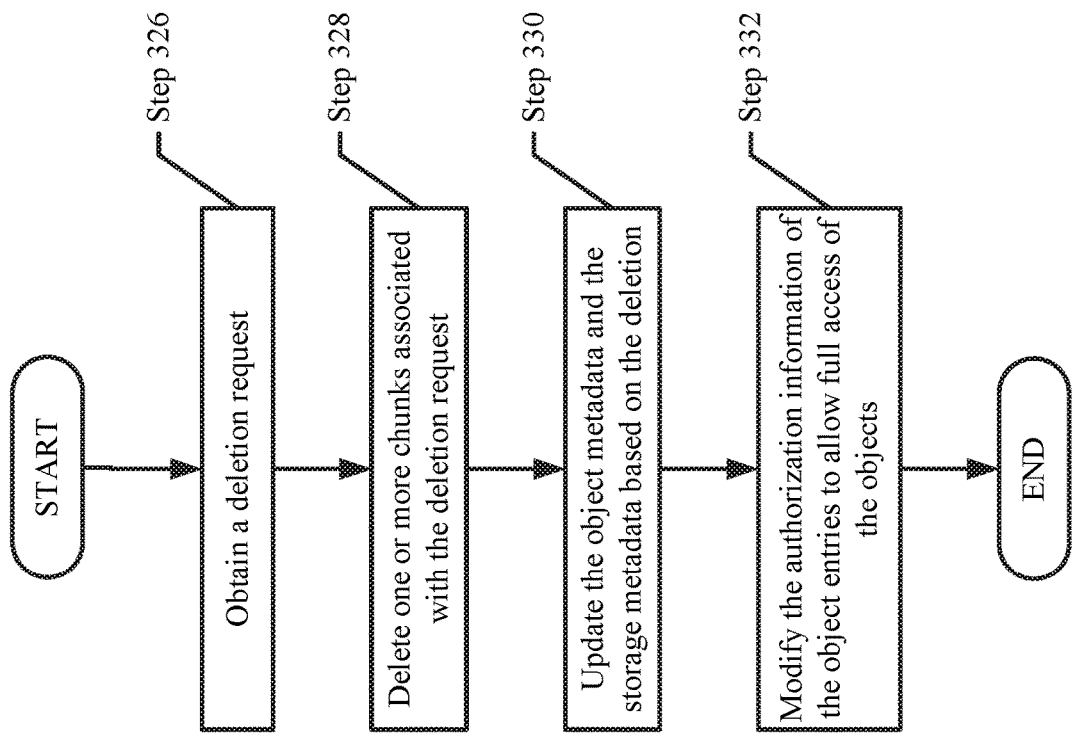
FIGS. 3B-3C show flowcharts for managing a litigation request in accordance with one or more embodiments of the invention.
Figure 3B:
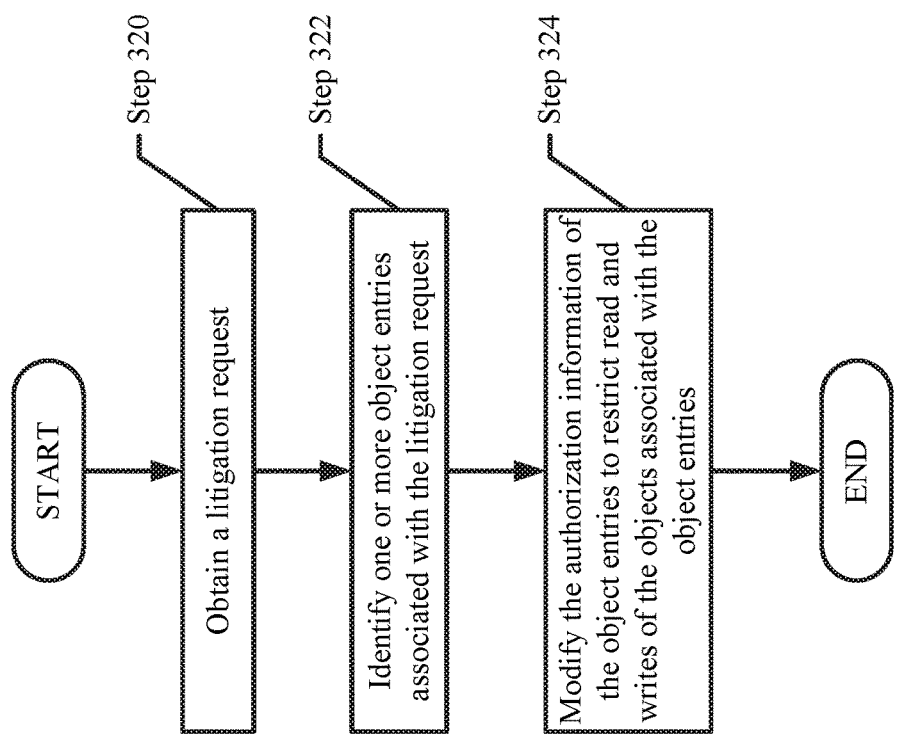

In one or more of embodiments of the invention, the authorization manager (129) is implemented as computer instructions, e.g., computer code, stored on a persistent storage that when executed by a processor of a data node (e.g., 126A, 126B) of the accelerator pool (120) cause the data node to provide the aforementioned functionality of the authorization manager (129) described throughout this application and/or all, or a portion thereof, of the method illustrated in FIGS. 3B-3C.

In one or more embodiments of the invention, the authorization manager (129) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the authorization manager (129) described throughout this application and/or all, or a portion thereof, of the method illustrated in FIGS. 3B-3C.

In one or more embodiments of the invention, the authorization manager (129) is implemented as a logical device. The logical device may utilize the computing resources of any number of computing devices and thereby provide the functionality of the authorization manager (129) described throughout this application and/or all, or a portion thereof, of the method illustrated in FIGS. 3B-3C.

Continuing with the discussion of FIG. 1B, different data nodes in the cluster may include different quantities and/or types of computing resources, e.g., processors providing processing resources, memory providing memory resources, storages providing storage resources, communicators providing communications resources. Thus, the system may include a heterogeneous population of nodes.

The heterogeneous population of nodes may be logically divided into: (i) an accelerator pool (120) including nodes that have more computing resources, e.g., high performance nodes (126A, 126B), than other nodes and (ii) a non-accelerator pool (130) including nodes that have fewer computing resources, e.g., low performance nodes (132, 134) than the nodes in the accelerator pool (120). For example, nodes of the accelerator pool (120) may include enterprise-class solid state storage resources that provide very high storage bandwidth, low latency, and high input-outputs per second (IOPS). In contrast, the nodes of the non-accelerator pool (130) may include hard disk drives that provide lower storage performance. While illustrated in FIG. 1B as being divided into two groups, the nodes may be divided into any number of groupings based on the relative performance level of each node without departing from the invention.

In one or more embodiments of the invention, the data nodes (126A, 126B, 132, 134) store data chunks and parity chunks along with storage metadata (as described below). The data nodes (126A, 126B, 132, 134) may include persistent storage that may be used to store the data chunks, parity chunks and storage metadata. The generation of the data chunks and parity chunks as well as the storage metadata is described below with respect to FIG. 3A. For additional details regarding the data nodes (126A, 126B, 132, 134), see, e.g., FIG. 1C.

In one or more embodiments of the invention, the non-accelerator pool (130) includes any number of fault domains. In one or more embodiments of the invention, a fault domain is a logical grouping of nodes (e.g., data nodes) that, when one node of the logical grouping of nodes goes offline and/or otherwise becomes inaccessible, the other nodes in the same logical grouping of nodes are directly affected. However, nodes in a different fault domain may be unaffected. For additional details regarding fault domains, see, e.g. FIG. 1E.

In one or more embodiments of the invention, each data node (126A, 126B, 132, 134) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data node (126A, 126B, 132, 134) described throughout this application and/or all, or a portion thereof, of the method illustrated in FIGS. 3A-3C.

In one or more embodiments of the invention, each of the data nodes (126A, 126B, 132, 134) is implemented as a logical device. The logical device may utilize the computing resources of any number of computing devices and thereby provide the functionality of the data nodes (126A, 126B, 132, 134) described throughout this application and/or all, or a portion thereof, of the method illustrated in FIGS. 3A-3C. For additional details regarding the data nodes (126A, 126B, 132, 134), see, e.g., FIG. 1C.

Figure 1C:
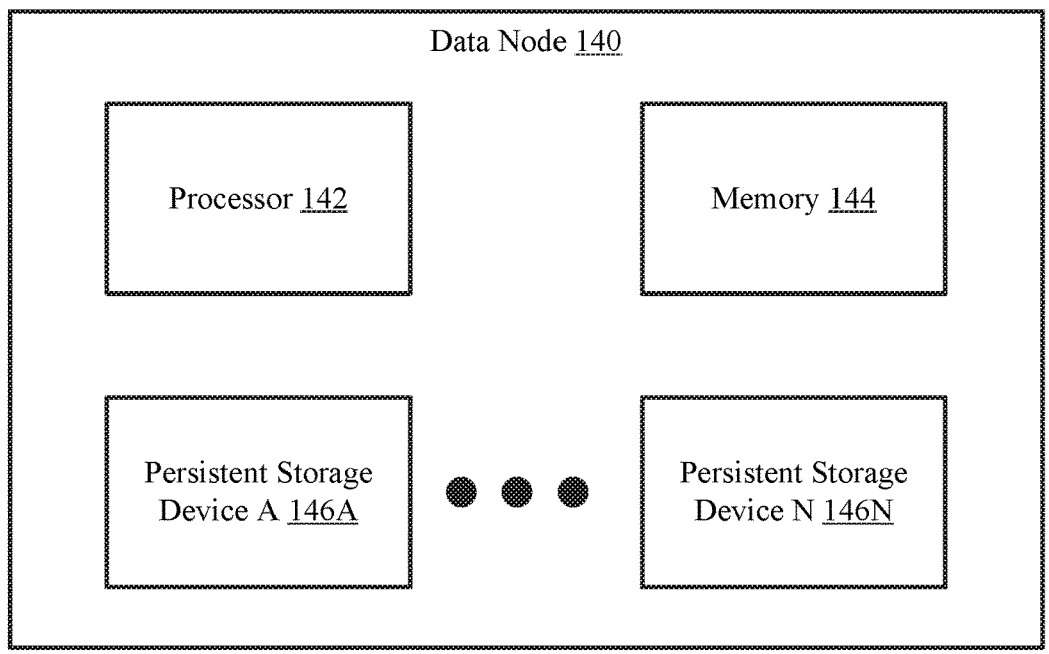
FIG. 1C shows a diagram of a data node in accordance with one or more embodiments of the invention.

FIG. 1C shows a diagram of a data node (140) in accordance with one or more embodiments of the invention. The data node (140) may be an embodiment of a data node (126A, 126B, 132, 134, FIG. 1B) discussed above. Each data node may be equipped with a processor (142), memory (144), and one or more persistent storage devices (146A, 146N). Each component of the data node (140) may be operatively connected to each other via wired and/or wireless connections. The data node (140) may have additional, fewer, and/or different components without departing from the invention. Each of the illustrated components of the data node (140) is discussed below.

In one or more embodiments of the invention, the processor (142) is a component that processes data and processes of requests. The processor (142) may be, for example, a central processing unit (CPU). The processor may process a request to rebuild data and/or metadata using data stored in memory (144) and/or the persistent storage devices (146A, 146N). The processor (142) may process other requests without departing from the invention.

In one or more embodiments of the invention, the data node includes memory (144) which stores data that is more accessible to the processor (142) than the persistent storage devices (146A, 146N). The memory (144) may be volatile storage. Volatile storage may be storage that stores data that is lost when the storage loses power. The memory may be, for example, Random Access Memory (RAM). In one or more embodiments of the invention, a copy of the storage metadata discussed in FIG. 1B and a copy of the object metadata discussed in FIG. 1B is stored in the memory (144) of the data node (140).

In one or more embodiments of the invention, the persistent storage devices (146A, 146N) store data. The data may be data chunks and/or parity chunks. In addition, the data may also include storage metadata. The persistent storage devices (146A, 146N) may be non-volatile storage. In other words, the data stored in the persistent storage devices (146A, 146N) is not lost or removed when the persistent storage devices (146A, 146N) lose power. Each of the persistent storage devices (146A, 146N) may be, for example, solid state drives, hard disk drives, and/or tape drives. The persistent storage devices may include other types of non-volatile or non-transitory storage mediums without departing from the invention. For additional details regarding the persistent storage devices, see, e.g., FIG. 1D.

Figure 1D:
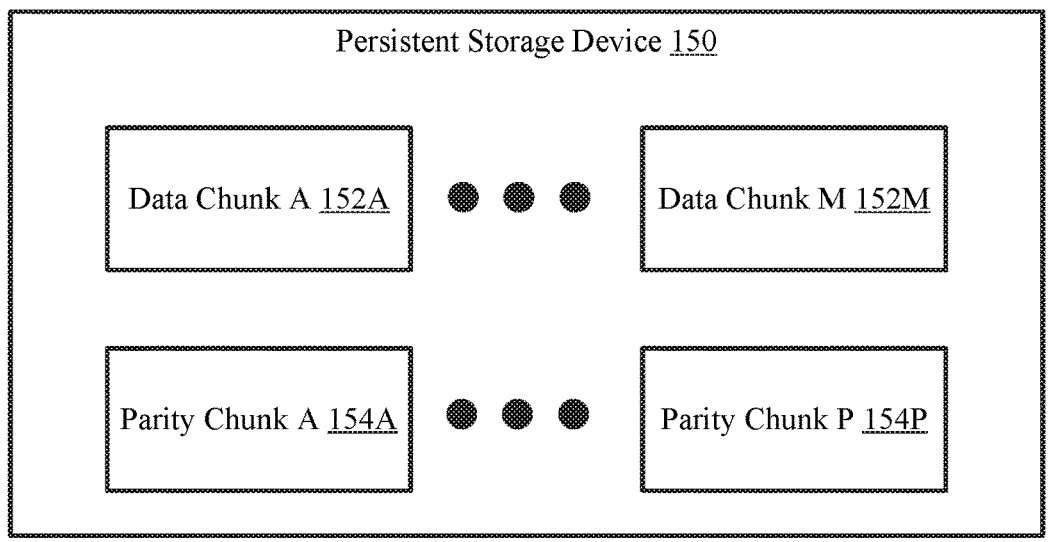
FIG. 1D shows a diagram of persistent storage in accordance with one or more embodiments of the invention.

FIG. 1D shows a diagram of a persistent storage device. The persistent storage device (150) may be an embodiment of a persistent storage device (146A, 146N) discussed above. As discussed above, the persistent storage device (150) stores data. The data may be data chunks (152A, 152M) and parity chunks (154A, 154P). Though not shown in FIG. 1D, the data may also include storage metadata and/or object metadata.

In one or more embodiments of the invention, a data chunk (152A, 152M) is a data structure that includes a portion of data that was obtained from a host. The data chunks (152A, 152M) may be deduplicated by a data processor and obtained by the data node (140) from the data processor. Each of the data chunks (152A, 152M) may be used by the data node (140) (or another data node) to reconstruct another data chunk or a parity chunk based on an erasure coding algorithm that was applied to the other data chunk or parity chunk.

In one or more embodiments of the invention, a parity chunk (154A, 154P) is a data structure that includes a parity value generated using an erasure coding algorithm. The parity value may be generated by applying the erasure coding algorithm to one or more data chunks stored in the data node (140) or other data nodes. Each of the parity chunks (154A, 154P) may be used by the data node (140) (or another data node) to reconstruct another parity chunk or a data chunk based on an erasure coding algorithm that was applied to the other parity chunk or data chunk.

Figure 1E:
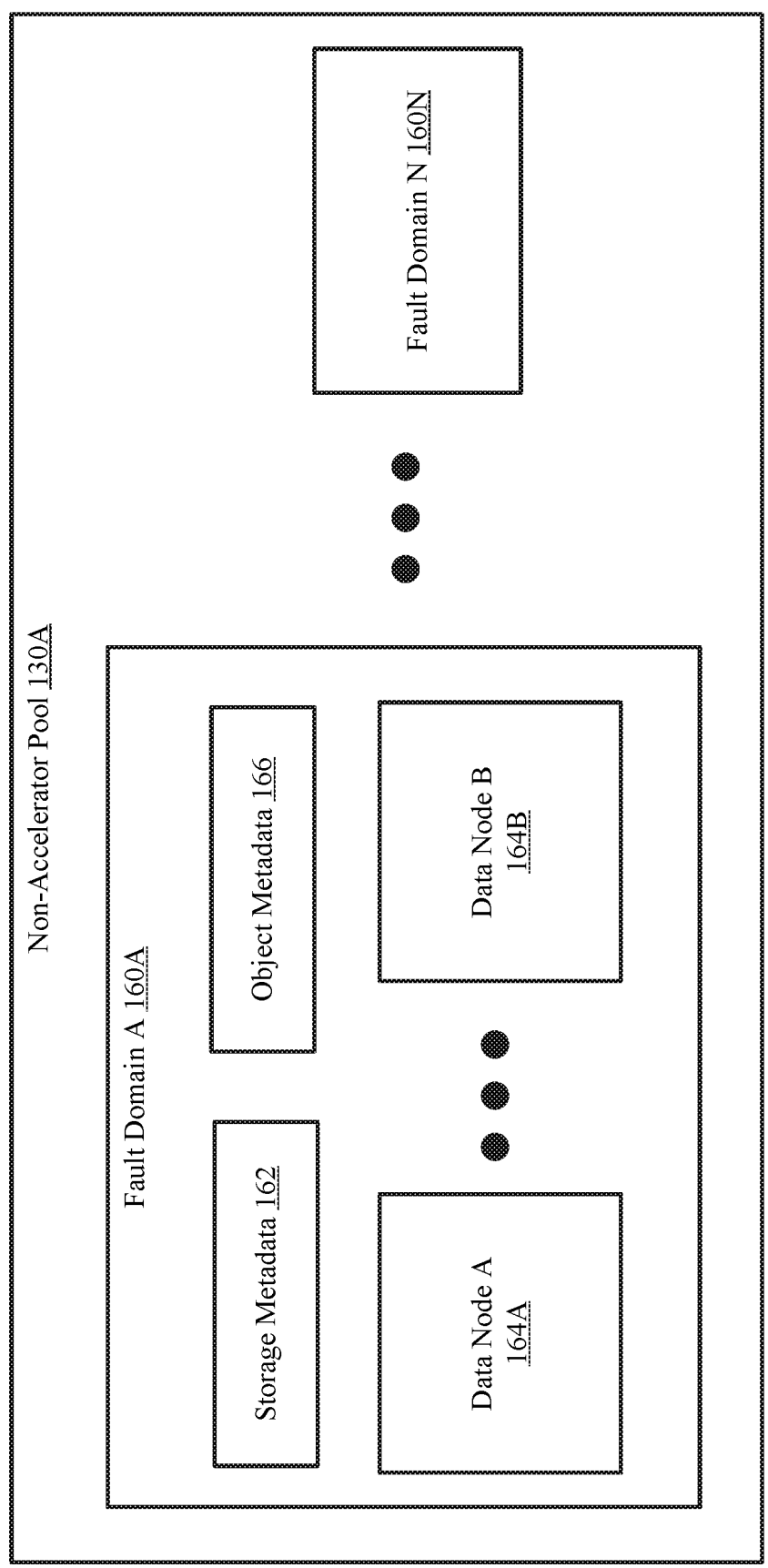
FIG. 1E shows a diagram of a non-accelerator pool in accordance with one or more embodiments of the invention.

FIG. 1E shows a diagram of a non-accelerator pool in accordance with one or more embodiments of the invention. The non-accelerator pool (130A) is an embodiment of the non-accelerator pool (130, FIG. 1B) discussed above. The non-accelerator pool (130A) may include any number of fault domains (160A, 160N).

As discussed above, a fault domain (160A, 160N) is a logical grouping of data nodes (164A, 164B) that, when one data node of the logical grouping of data nodes goes offline and/or otherwise becomes inaccessible, the other nodes in the logical grouping of nodes are directly affected. The effect of the node going offline to the other nodes may include the other nodes also going offline and/or otherwise inaccessible. The non-accelerator pool (130) may include multiple fault domains. In this manner, the events of one fault domain in the non-accelerator pool (130A) may have no effect to other fault domains in the non-accelerator pool (130A).

For example, two data nodes may be in a first fault domain (e.g., 160A). If one of these data nodes in the first fault domain (160A) experiences an unexpected shutdown, other nodes in the first fault domain may be affected. In contrast, another data node in a second fault domain may not be affected by the unexpected shutdown of a data node in the first fault domain. In one or more embodiments of the invention, the unexpected shutdown of one fault domain does not affect the nodes of other fault domains. In this manner, data may be replicated and stored across multiple fault domains to allow high availability of the data.

As discussed above, the data chunks and parity chunks of a slice (e.g., generated using the erasure coding described in FIG. 3A) may be stored in different fault domains (160A, 160N). Storing the data chunks and parity chunks in multiple fault domains may be for recovery purposes. In the event that one or more fault domains storing data chunks or parity chunks become inaccessible, the data chunks and/or parity chunks stored in the remaining fault domains may be used to recreate the inaccessible data. In one embodiment of the invention, as part of (or in addition to) the chunk metadata, the storage metadata (162) tracks the members of each slice (i.e., which data chunks and which parity chunks are part of a slice). This information may be used to aid in any recover operation that is required to be performed on the data stored in the data cluster.

In one or more embodiments of the invention, each fault domain (160A, 160N) stores a copy of storage metadata (162) and a copy of object metadata (166) obtained from an accelerator pool and/or from another fault domain (160A, 160N) distributing a copy of the storage metadata. The copy of storage metadata (162) and the copy of the object metadata (166) in a fault domain (e.g., 160A) may each be stored in one or more data nodes (164A, 164B) of the fault domain. The copy of storage metadata (162) and the copy of object metadata (166) may each be stored in any other computing device associated with the fault domain (160A) without departing from the invention.

Figure 2A:
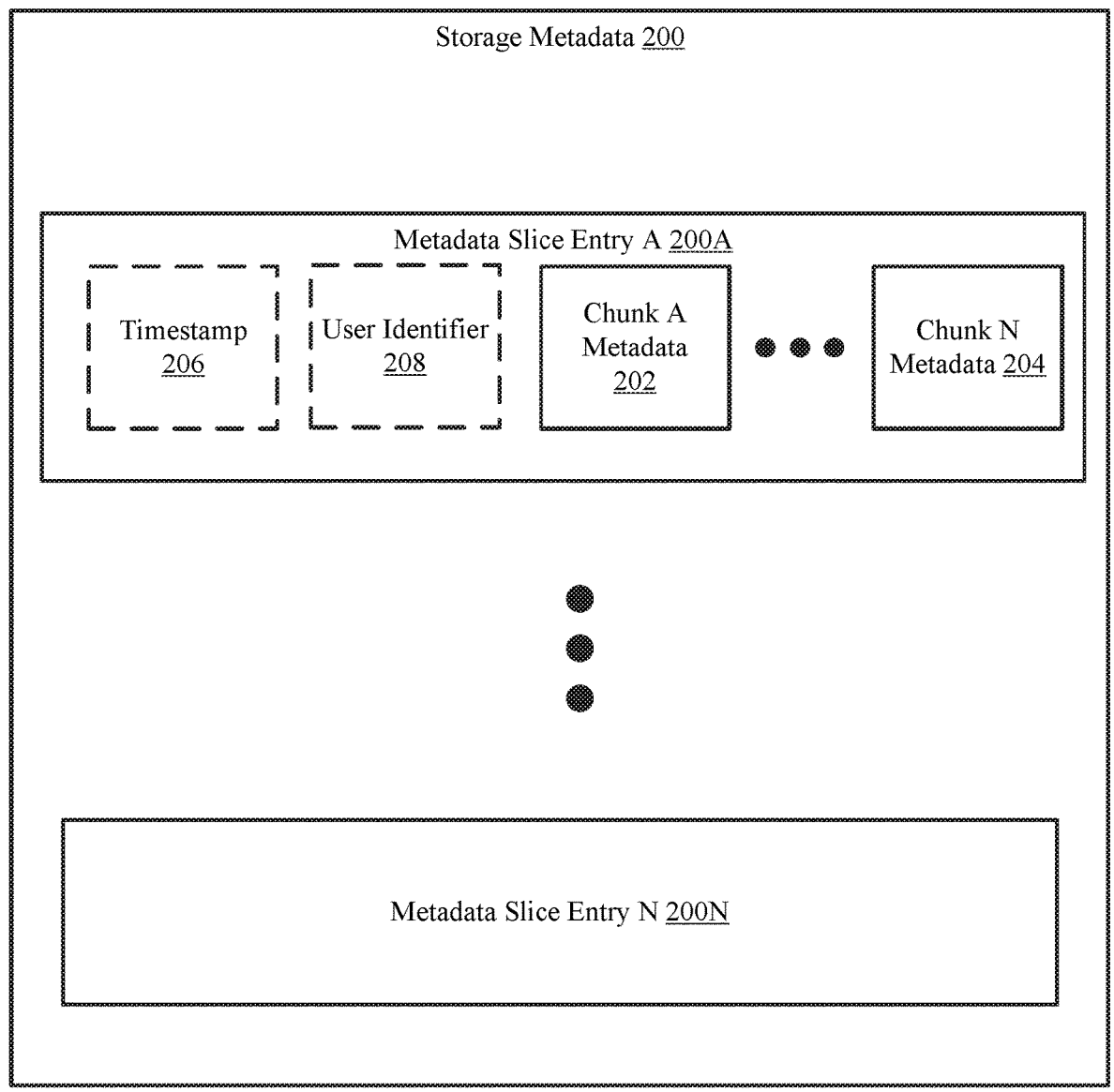
FIG. 2A shows a diagram of storage metadata in accordance with one or more embodiments of the invention.

FIG. 2A shows a diagram of storage metadata in accordance with one or more embodiments of the invention. The storage metadata (200) may be an embodiment of the storage metadata (124, FIG. 1B; 162, FIG. 1E) discussed above. As discussed above, the storage metadata (200) stores information about data chunks or parity chunks (collectively, chunks). The storage information may include one or more metadata slice entries (200A, 200N). Each metadata slice entry (200A, 200N) may include chunk metadata (202, 204), a timestamp (206), and a user identifier (208). The storage metadata (200) may include additional, fewer, and/or different portions without departing from the invention. Each of the aforementioned portions of the storage metadata (200) is discussed below.

In one or more embodiments of the invention, a metadata slice entry (200A, 200N) is an entry that specifies metadata associated with chunks of a data generated using an erasure coding procedure. The metadata slice entry (200A, 200N) includes chunk metadata (202, 204). Each chunk metadata (202, 204) may correspond to metadata for a data chunk or a parity chunk. Each chunk metadata (202, 204) may include information about a chunk such as, for example, a unique identifier (e.g., a fingerprint) and a storage location of the chunk, e.g., the non-accelerator pool. The unique identifier of a chunk may be generated using the chunk (e.g., calculated using the data of the chunk).

In one or more embodiments of the invention, the timestamp (206) specifies a point in time in which the metadata slice was generated and/or stored in the non-accelerator pool. The timestamp (206) may be used to associate the metadata slice to the point in time. In one or more embodiments of the invention, the timestamp (206) is optionally included in the metadata slice entries (200A, 200N).

In one or more embodiments of the invention, the user ID (208) specifies a user, or other legal entity, that generated the data associated with the metadata slice entry (200A, 200N). The user ID (208) may be, for example, a string of numbers, letters, symbols, or any combination thereof that uniquely identifies the user, or other entity. In one or more embodiments of the invention, the user ID (208) is optionally included in the metadata slice entries (200A, 200N).

In one or more embodiments of the invention, a legal entity is a person, a group of people, a partnership, corporation, any other business entity, or any combination thereof.

Figure 2B:
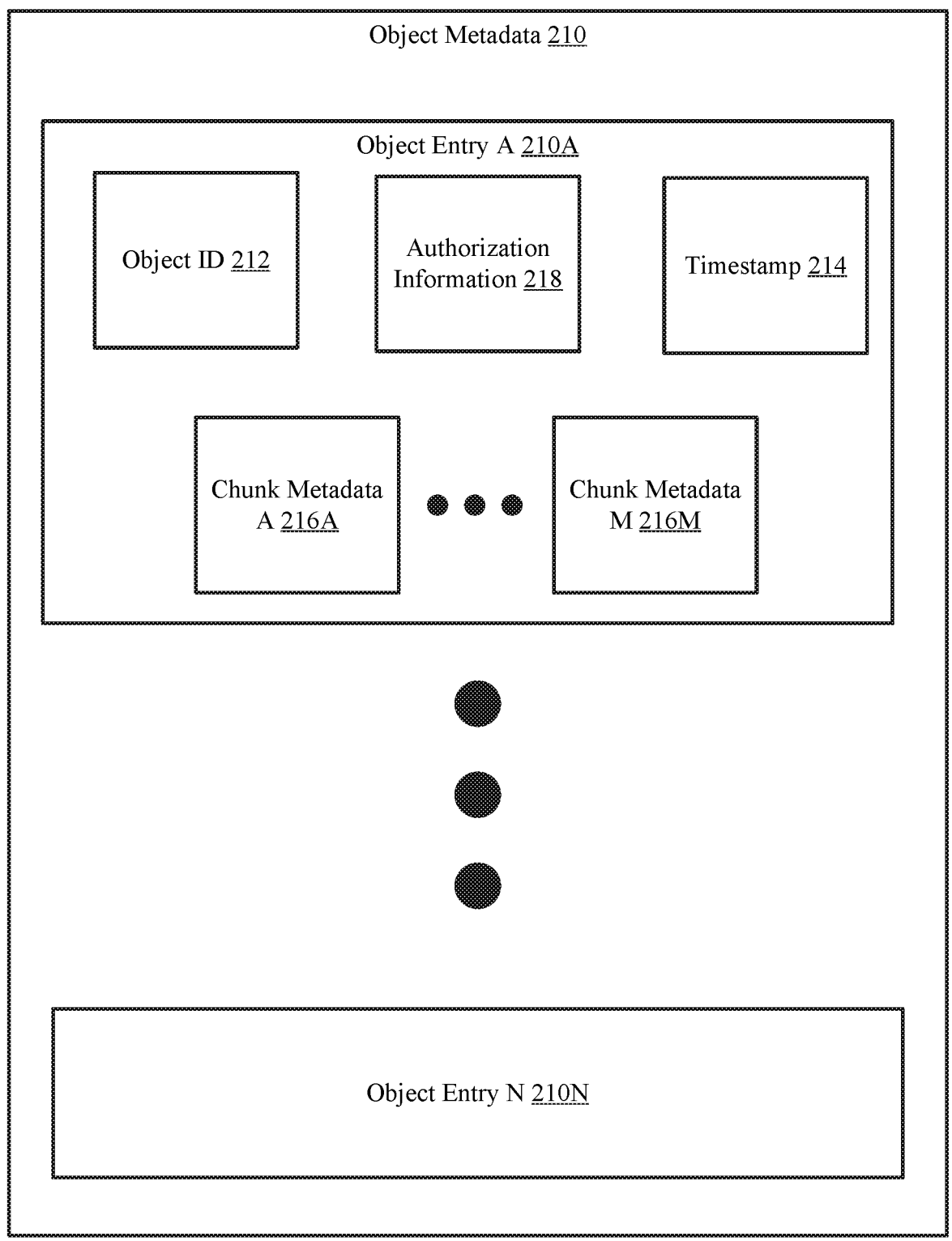
FIG. 2B shows a diagram of object metadata in accordance with one or more embodiments of the invention.

FIG. 2B shows a diagram of object metadata in accordance with one or more embodiments of the invention. The object metadata (210) may be an embodiment of the storage metadata (128, FIG. 1B; 166, FIG. 1E) discussed above. As discussed above, the object metadata (210) stores information about objects. The object metadata (210) may include one or more object entries (210A, 210N). Each metadata slice entry (200A, 200N) may include an object identifier (ID) (212), authorization information (218), chunk metadata (216A, 216M) and a timestamp (214). Each of the aforementioned portions of the object metadata (210) is discussed below.

In one or more embodiments of the invention, the object ID (212) is an identifier that specifies an object associated with the object entry (210A, 210N). The object ID (212) may be, for example, a string of numbers, letters, symbols, or any combination thereof that uniquely identifies the object.

In one or more embodiments of the invention, the authorization information (218) specifies the kind of access that a user(s) or legal entity (entities) have to data associated with the object of the object entry (210A, 210N). The kind of access specified by the authorization information may include, but is not limited to, read and/or access the data (and associated metadata) ("read"), write new data associated with the object ("write"), access metadata associated with the data ("info"), modify and/or update existing data ("update"), and no access to the data and/or the metadata ("none"). The authorization information (218) may specify one or more users (or legal entities) (e.g., using user IDs) and the kind(s) of access that each user has to the data associated with the object entry (210A, 210N).

In one or more embodiments of the invention, the authorization information specifies that a user(s) (or legal entity) has "full access." A user (or legal entity) specified to have "full access" is a user (or legal entity) that is specified to have access to all of the previously-discussed kinds of access (i.e., "read," "write," "info," "update," etc.). In contrast, the authorization information may specify that the object has "legal hold." An object specified to have "legal hold" is an object where specified user(s) (or legal entity) may only have the "info" access to the object, and any non-specified users have no access (i.e., "none") to the object. Alternatively, an object specified to have "legal hold" is an object where specified user(s) (or legal entity) may only have the "read" access, and any non-specified users have no access (i.e., "none") to the object.

In one or more embodiments of the invention, the timestamp (214) specifies a point in time that corresponds to a state of the object as specified by a set of chunk metadata. The timestamp (214) may be used to replay the object to a point in time. In one or more embodiments of the invention, the object is replayed to a point in time when the data associated with the object that was part of the object at the point in time is reconstructed to generate the object at the point in time. Said another way, the content of each object may vary over time and each time the object is modified a corresponding object entry is created where the object entry specifies chunk metadata for the chunks that make up the object at that point in time.

For example, at a first point in time, the object may include a first set of data, of which there is a first chunk and a second chunk. At a second point in time, the object may include a second set of data, of which there is a first chunk and a third chunk. The third chunk may be a modified version of the second chunk. The object may be replayed to the first point in time by obtaining the first chunk and the second chunk. The object may be replayed to the second point in time by obtaining the first chunk and the third chunk. For each point in time, there may be an object entry that specifies the object, the point in time, and each chunk used to replay the object.

In one or more embodiments of the invention, the chunk metadata (216A, 216M) each corresponds to a data chunk or parity chunk associated with the object at the point in time specified by the timestamp (214). The chunk metadata may include information about the data chunk or parity chunk such as, for example, a unique identifier (e.g., a fingerprint). The unique identifier may be, for example, a string of numbers, letters, symbols, or any combination thereof that uniquely identifies the chunk.

In one or more embodiments of the invention, an object entry (210A) is associated with more than one timestamp (214). In such embodiments, each chunk metadata (216A, 216M) may specify multiple chunks associated with a point in time. For example, after every iteration of an object (i.e., an object is associated with a new point in time), an object entry (210A, 210N) is updated with new chunk metadata (216A, 216M) that specifies the chunks of that iteration. In this manner, each object is associated with one object entry (210A, 210N) and each chunk metadata (202, 204) is associated with multiple chunks of an object at a point in time.

The object metadata (210) may be organized using other schemes without departing from the invention.

FIG. 3A shows a flowchart for storing data in a data cluster in accordance with one or more embodiments of the invention. The method shown in FIG. 3A may be performed by, for example, a data processor (122, FIG. 1B). Other components of the system illustrated in FIG. 1B may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, data associated with a user is obtained from a host. The data may be a file, a file segment, a collection of files, or any other type of data without departing from the invention. The data may be associated with the user by being generated by the user.

In step 302, an erasure coding procedure is performed on the data to generate data chunks and parity chunks. In one or more embodiments of the invention, the erasure coding procedure includes dividing the obtained data into portions, referred to as data chunks. Each data chunk may include any number of data segments associated with the obtained data. The individual data chunks may then be combined (or otherwise grouped) into slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. Non-limiting examples of erasure coding algorithms are RAID-3, RAID-4, RAID-5, and RAID-6. Other erasing coding algorithms may be used without departing from the invention. Continuing with the above discussion, if the erasing code procedure is implementing RAID-3, then a single parity value is calculated. The resulting parity value is then stored in a parity chunk. If erasure coding procedure algorithm requires multiple parity values to be calculated, then the multiple parity values are calculated with each parity value being stored in a separate data chunk.

As discussed above, the data chunks are used to generate parity chunks in accordance with the erasure coding procedure. More specifically, the parity chunks may be generated by applying a predetermined function (e.g., P Parity function, Q Parity Function), operation, or calculation to at least one of the data chunks. Depending on the erasure coding procedure used, the parity chunks may include, but are not limited to, P parity values and/or Q parity values.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q = g_0 \cdot D_0 + g_1 \cdot D_1 + g_2 D_2 + \ldots + g_{n-1} \cdot D_{n-1}$, where Q corresponds to the Q parity, g is a generator of the field, and the value of D corresponds to the data in the data chunks.

In one or more embodiments of the invention, the number of data chunks and parity chunks generated is determined by the erasure coding procedure, which may be specified by the host, by the data cluster, and/or by another entity.

In step 304, deduplication is performed on the data chunks to obtain deduplicated data chunks. Additionally, a storage metadata slice entry is generated based on the deduplication data chunks and the parity chunks. Further, an object slice entry is generated based data chunks (i.e., non-deduplicated data chunks) and the parity chunks.

In one or more embodiments of the invention, the deduplication is performed in the accelerator pool by identifying the data chunks of the obtained data and assigning a fingerprint to each data chunk. A fingerprint is a unique identifier that may be stored in metadata of the data chunk. The data processor performing the deduplication may generate a fingerprint for a data chunk and identify whether the fingerprint matches an existing fingerprint stored in storage metadata stored in the accelerator pool. If the fingerprint matches an existing fingerprint, the data chunk may be deleted, as it is already stored in the data cluster. If the fingerprint does not match any existing fingerprints, the data chunk may be stored as a deduplicated data chunk. Additionally, the fingerprint of each deduplicated data chunk is stored in a storage metadata slice entry of the storage metadata. A fingerprint (or other unique identifier) of each parity chunk is also generated and stored in the storage metadata slice entry.

In one or more embodiments of the invention, the deduplicated data chunks collectively make up the deduplicated data. In one or more embodiments of the invention, the deduplicated data chunks are the data chunks that were not deleted during deduplication.

In step 306, the deduplicated data chunks and parity chunk(s) are stored across data nodes in different fault domains in a non-accelerator pool. As discussed above, the deduplicated data chunks and the parity chunk(s) are stored in a manner that minimizes reads and writes from the non-accelerator pool. In one embodiment of the invention, this minimization is achieved by storing data chunks and parity chunks, which are collective referred to as a slice (or slice), in the same manner as a prior version of the slice. The data processor may use, as appropriate, storage metadata for the previously stored data chunks and parity chunks to determine where to store the data chunks and parity chunks in step 306.

More specifically, in one embodiment of the invention, if the deduplicated data chunks and parity chunks are the first version of a slice (as opposed to a modification to an existing/previously stored slice), then the deduplicated data chunks and parity chunks may be stored across the data nodes (each in a different fault domain) in the non-accelerator pool. The location in which the data chunk or parity chunk is stored is tracked using the storage metadata. The scenario does not require the data processor to use location information for previously stored data chunks and parity chunks.

However, if the deduplicated data chunks and parity chunks are the second version of a slice (e.g., a modification to a previously stored slice), then the deduplicated data chunks and parity chunks are stored across the nodes (each in a different fault domain) in the non-accelerator pool using prior stored location information. The information about the location in which the data chunk or parity chunk for the second version of the slice is stored in the storage metadata.

For example, consider a scenario in which the first version of the slice includes three data chunks (D1, D2, D3) and one parity chunk (P1) that were stored as follows: Data Node 1 stores D1, Data Node 2 stores D2, Data Node 3 stores D3, and Data Node 4 stores P1. Further, in this example, a second version of the slice is received that includes three data chunks (D1, D2', D3) and one newly calculated parity chunk (P1'). After deduplication only D2' and P r need to be stored. Based on the prior storage locations (also referred to as locations) of the data chunks (D1, D2, and D3) and parity chunks (P1) for the first version of the slice, D2' is stored on Node 2 and P r is stored on Node 4. By storing the D2' on Node 2 and P r on Node 4 the data chunks and parity chunks associated with the second slice satisfy the condition that all data chunks and parity chunks for the second version of the slice are being stored in separate fault domains. If the location information was not taken into account, then the entire slice (i.e., D1, D2', D3, and P1') would need to be stored in order to guarantee that the requirement that all data chunks and parity chunks for the second version of the slice are being stored in separate fault domains is satisfied.

In one or more embodiments of the invention, if the data node that obtains the deduplicated data chunk, which is a modified version of a prior stored deduplicated data chunk, then the data node may: (i) store the modified version of the deduplicated data chunk (i.e., the data node would include two versions of the data chunk) or (ii) store the modified version of the deduplicated data chunk and delete the prior version of the deduplicated data chunk.

In one embodiment of the invention, the data processor includes functionality to determine whether a given data chunk is a modified version of a previously stored data chunk. Said another way, after the data is received from a host divided into data chunks and grouped into slices, the data processor includes functionality to determine whether a slice is a modified version of a prior stored slice. The data processor may use the fingerprints of the data chunks within the slice to determine whether the slice is a modified version of a prior stored slice. Other methods for determining whether a data chunk is a modified version of a prior stored data chunk and/or whether a slice is a modified version of a prior slice without departing from the invention.

In step 308, a distribution of storage metadata and object metadata is initiated. In one or more embodiments of the invention, the storage metadata and the object metadata are distributed by generating a copy of the storage metadata that includes the storage metadata slice entry generated in step 304 and a copy of object metadata which includes the object entry and sending the copy of storage metadata and the copy of object metadata to the non-accelerator pool.

In one or more embodiments of the invention, the copy of storage metadata and the copy of object metadata are sent to a data node of a fault domain by the data processor. The data processor may further instruct the data node to distribute the copy of storage metadata and the copy of object metadata to other data nodes in the fault domain or to other data nodes in other fault domains. In this manner, a copy of the storage metadata and a copy of the object metadata is stored in multiple fault domains in the event of a storage metadata failure.

In one or more embodiments of the invention, the copy of storage metadata and the copy of object metadata are sent to multiple fault domains by the data processor. The data processor may send a copy of storage metadata to one or more data nodes of each of the multiple fault domains. In this manner, a copy of the storage metadata and a copy of the object metadata is stored in multiple fault domains in the event of a storage metadata failure.

While FIG. 3A describes erasure coding and deduplicating the data, embodiments of the invention may be implemented where the data is only erasure coded and not deduplicated. In such embodiments, step 304 includes generating a storage metadata slice using non-deduplicated data chunks and parity chunks and step 306 includes distributing non-deduplicated data chunks and parity chunks.

FIGS. 3B-3C show flowcharts for managing a litigation request in accordance with one or more embodiments of the invention. The method shown in FIGS. 3B-3C may be performed by, for example, an authorization manager (129, FIG. 1B). Other components of the system illustrated in FIG. 1B may perform the method of FIGS. 3B-3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, a litigation request is obtained. The litigation request may be a request to set a legal hold on one or more objects stored in the data cluster. In one or more embodiments of the invention, the legal hold includes restricting access to the data associated with the objects. The litigation request may specify the object(s) (e.g., using an object ID) to be restricted and the type of restriction to be placed on the objects.

The litigation request may be generated as a result of an ongoing litigation procedure associated with the specified object(s). The litigation procedure may be performed to determine if any fraudulent action occurred involving the specified object(s). The fraudulent action may include, for example, a user obtaining unauthorized knowledge and/or information and modifying one or more objects based on the unauthorized knowledge and/or information.

In step 322, one or more object entries associated with the litigation request are identified. In one or more embodiments of the invention, the authorization manager analyzes the object metadata stored in the accelerator pool to identify all object entries that includes an object ID that corresponds to an object ID specified in the litigation request.

In step 324, the authorization information of each identified object entry is modified to restrict read and writes of the objects associated with the object entries. This results in all chunks associated with the object being associated with the modified access restrictions. In one or more embodiments of the invention, the authorization information is modified by updating the kinds of access for each user specified in the authorization information. For example, the authorization information may be modified so that the only kinds of access any user has is "info" and/or "read." As discussed above, "info" refers to having access to metadata associated with the object entry, and "read" refers to having access to read the data associated with the object entry. Other kinds of access restrictions may be applied to the object without departing from the invention.

In one or more embodiments of the invention, the authorization manager sets the authorization information of each object entry to "legal hold." In this manner, the only kind of access to the object that a specified user may have is "info."

At a later point in time, the litigation procedure may reach a determination that a fraudulent action was committed involving the specified objects. Turning to FIG. 3C, in step 326, a deletion request is obtained. The deletion request may specify one or more object entries to be deleted.

Alternatively, the deletion request may specify one or more objects and a period of time in which to delete data associated with object entries within the period of time. For example, a deletion request may specify deleting object entries and data associated with object entries that specify a timestamp after a specific point in time. The authorization manager may identify the object entries from the object metadata using the deletion request.

In step 328, one or more chunks associated with the deletion request are deleted. In one or more embodiments of the invention, the authorization manager uses the identified object entries to identify chunks associated with the identified object entries. The authorization manager may further utilize storage metadata of the acceleration pool to identify storage locations of the identified chunks. The authorization manager may locate the chunks to be deleted and subsequently delete the data chunks.

In step 330, the object metadata and the storage metadata are updated based on the deletion. In one or more embodiments of the invention, the object metadata is updated by deleting one or more object entries associated with the deleted chunks. In one or more embodiments of the invention, the deleted object entries are the identified object entries of step 326.

Alternatively, the object metadata may be updated by updating chunk metadata of the identified object entries to specify the deletion of the data chunks. In this manner, the object entries remain stored in the object metadata after the data associated with the object entries has been deleted for logging or tracking purposes.

In one or more embodiments of the invention, the storage metadata is updated by deleting one or more metadata slice entries that specify the storage of the data chunks prior to being deleted.

In step 332, the authorization information of the remaining object entries (i.e., object entries that were previously associated with a litigation hold) are modified to allow full access (or another level of access) of the objects. In one or more embodiments of the invention, the authorization information is modified by identifying one or more object entries associated with the object of the deletion request and removing the "legal hold" kind of access from the authorization information and replacing the kinds of access placed on the object entries prior to the litigation request. For example, if, prior to a litigation request associated with an object entry, authorization information of the object entry specified authorization information allowing full access for a user with a user ID U1, the authorization manager may return the authorization information to specify full access for U1.

Example

Figure 4A:
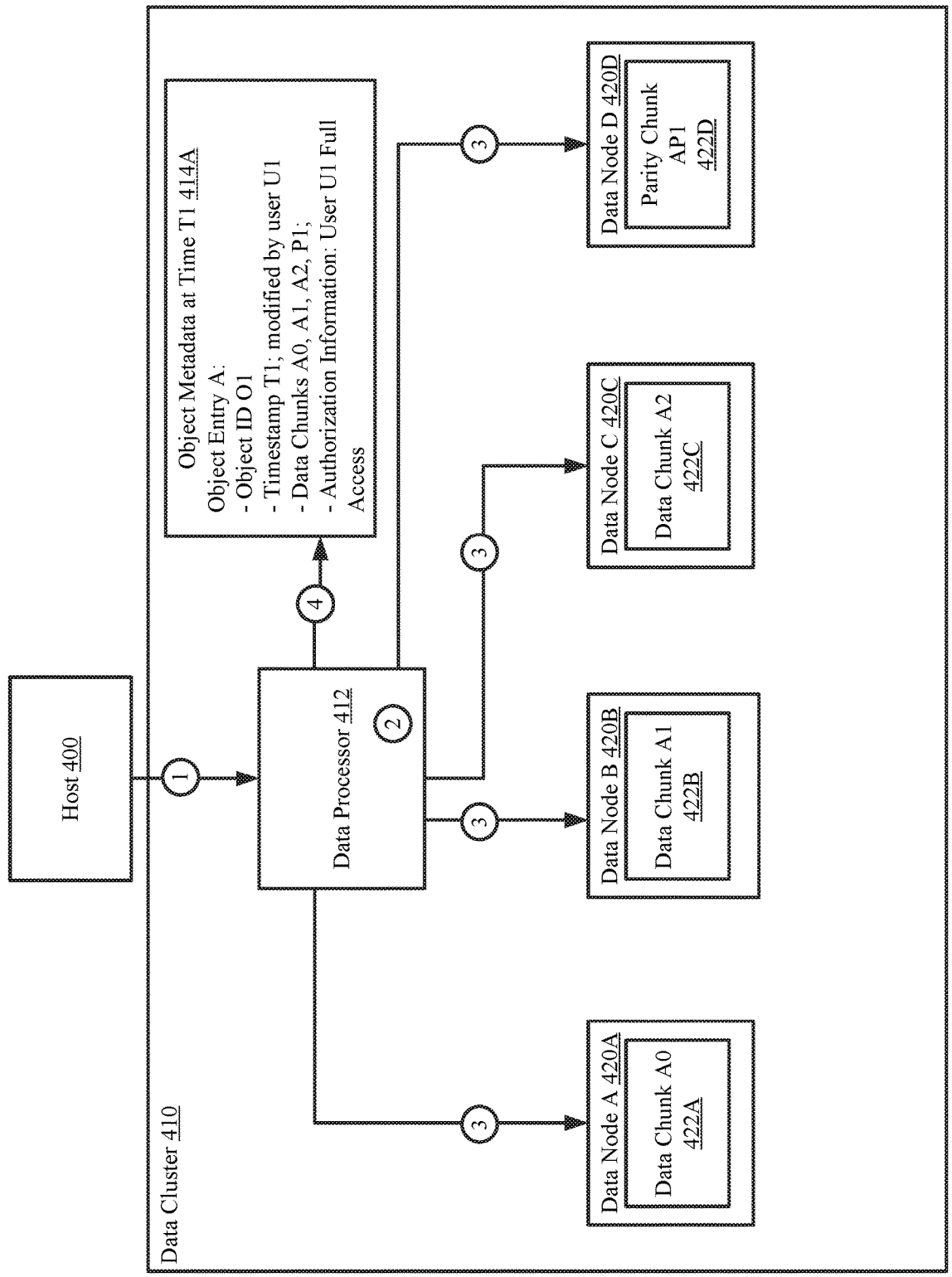
FIGS. 4A-4D show an example in accordance with one or more embodiments of the invention.
Figure 4B:
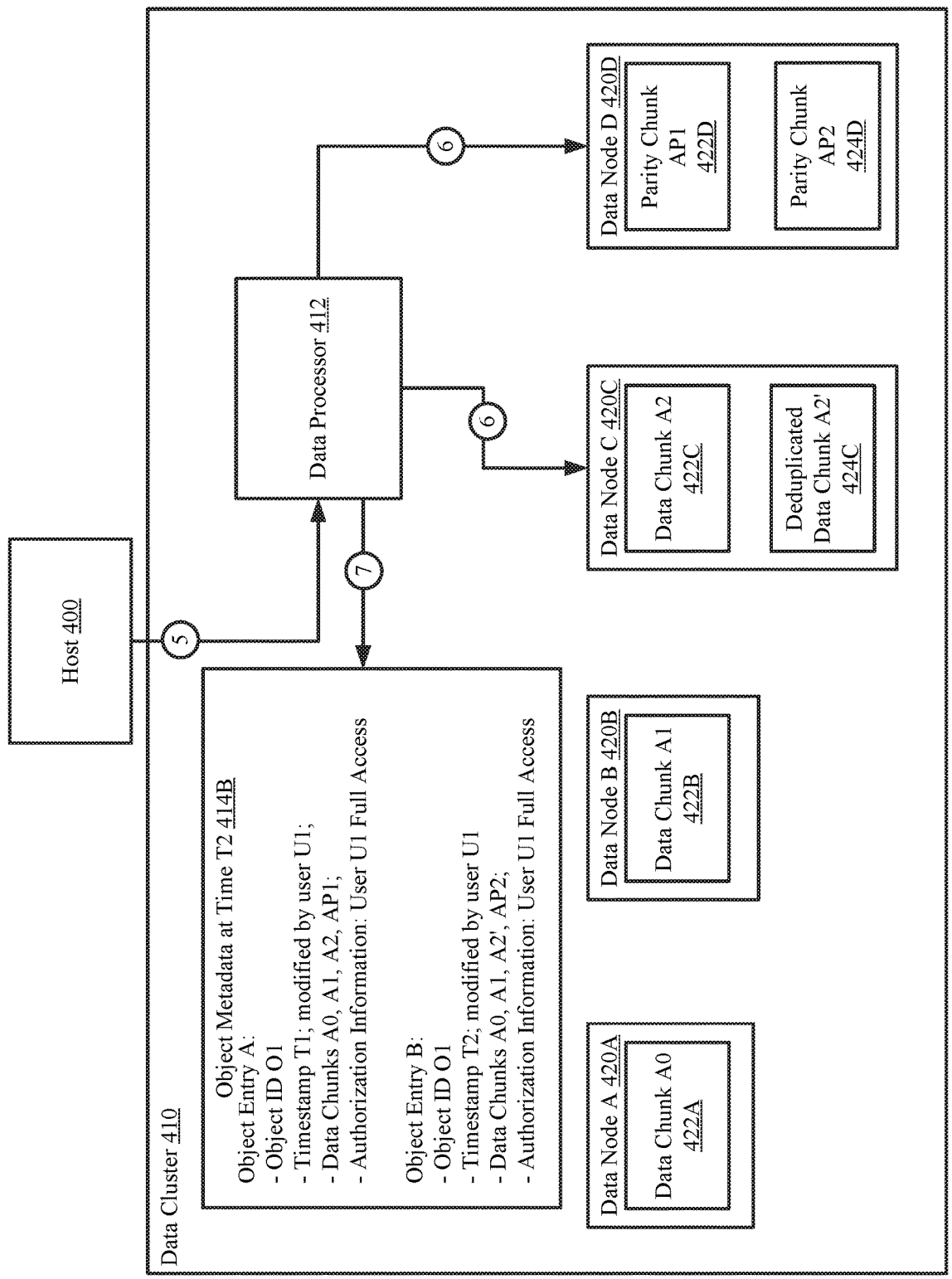
Figure 4C:
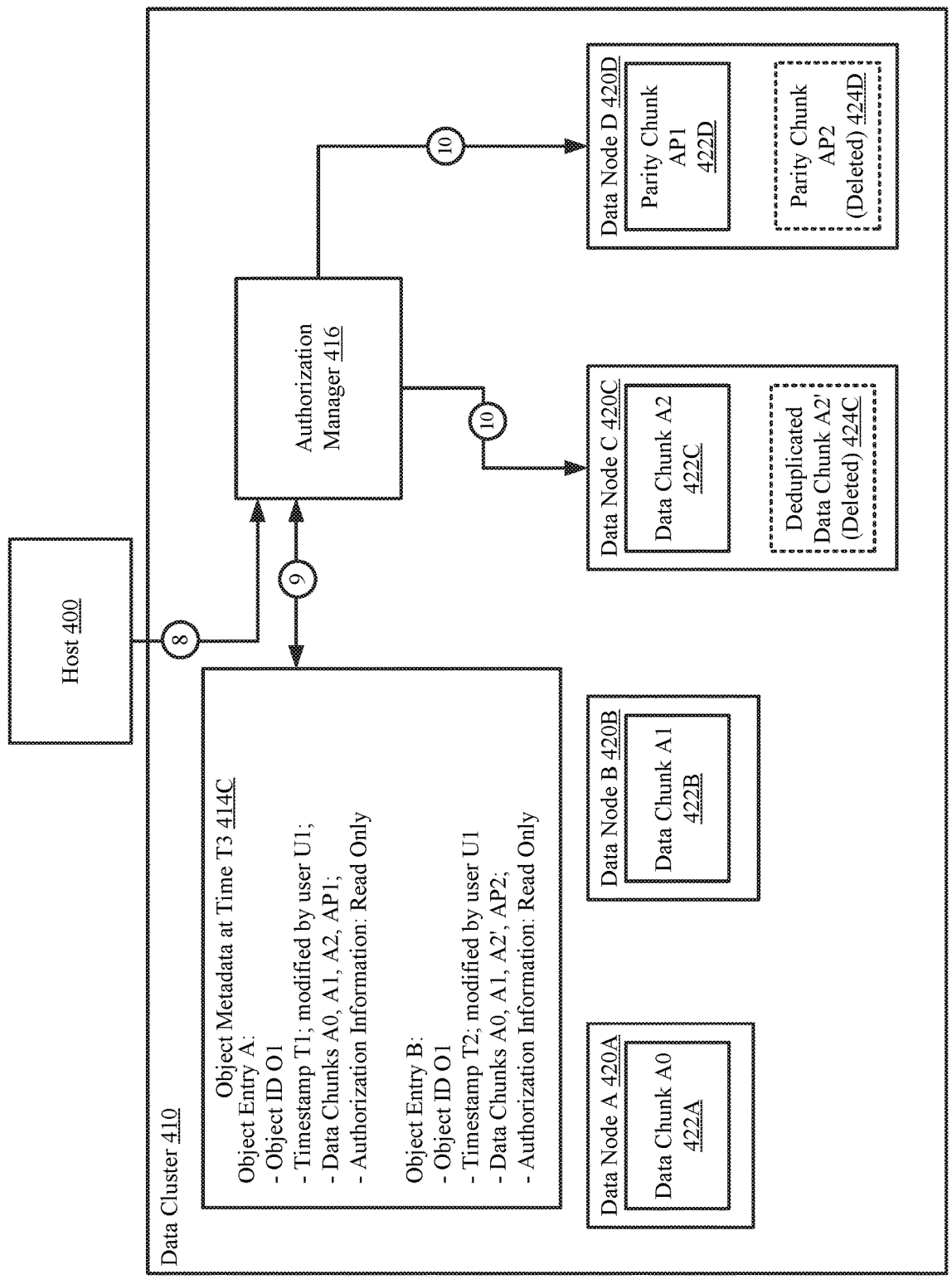

The following section describes an example. The example is not intended to limit the invention. The example is illustrated in FIGS. 4A-4C. Turning to the example, consider a scenario in which a data cluster obtains data from a host. The data in this example is an object O1. The host requests the object O1 be stored in the data cluster using a 3:1 erasure coding procedure. FIG. 4A shows a diagram a system in accordance with one or more embodiments of the invention. The host (400) sends the request to a data processor (412) of an accelerator pool (410) [1].

The data processor (412) performs the method of FIG. 3A to store the obtained object. Specifically, the data processor performs an erasure coding procedure on the object O1 [2]. In this example, assume that the erasure coding procedure includes implementing RAID-3. The result of the erasure coding procedure is a group of three data chunks A0, A1, and A2 (422A, 422B, 422C) and a parity chunk AP1 (422D). The data chunks and parity chunk may further go under a deduplication operation to obtain deduplicated data chunks. Because this object is not part of a previously-stored object, all three data chunks are deduplicated data chunks and, as such, all need to be stored in the non-accelerator pool.

The deduplicated data chunks and the parity chunk are stored in the non-accelerator pool [3]. Specifically, each of the three deduplicated data chunk and the parity chunk is stored in a unique fault domain. In other words, a first deduplicated data chunk A0 (422A) is stored in data node A (420A) of a first fault domain, a second deduplicated data chunk A1 (422B) is stored in data node B (420B) of a second fault domain, a third deduplicated data chunk (422C) is stored in data node C (420C) of a third fault domain, and the parity chunk (420D) is stored in data node D (420D) of a fourth fault domain.

In addition to storing the deduplicated data chunks and the parity chunks, the data processor generates a storage metadata slice entry in storage metadata (not shown) and an object entry in object metadata (414A) [4]. A timestamp and a unique identifier of each deduplicated data chunk and parity chunk are stored in the storage metadata slice entry and in the object entry. At this point in time, the object metadata (414A) includes object entry A, which is associated with object O1. The object entry specifies providing full access to user U1 that generated the data associated with the object entry.

FIG. 4B shows a diagram of the example system at later point in time. A second request is sent to the data processor (412) at the later point in time (T2) to store data associated with the object O1 [5]. The data processor perform an erasure coding procedure on the object to result in data chunks A0 (422A), A1 (422B), A2' (424C), and parity chunk AP2 (424D). Data chunk A2' (424C) is a modification of data chunk A2 (422C). The data processor (412) further performs a deduplication operation to obtain deduplicated data chunk A2' (424C) by determining that data chunks A0 (422A) and A1 (422B) are already stored in the data cluster (410).

The data processor then stores the deduplicated data chunk A2' (424C) in data node C (420C) based on storage metadata that specifies the storage of data chunk A2 (422C). Further, the data processor (412) stores parity chunk AP2 (424D) in data node D (420D) [6]. The data processor generates a second object entry (Entry B) that specifies a second timestamp and stores the object entry in the object metadata (414B) [7]. At this point in time, two object entries are stored in the object metadata (414B), where the first object entry specifies a first point in time (T1) and data chunks A0, A1, and A2. The second object entry specifies the second point in time (T2) and data chunks A0, A1, and A2'.

At a later point in time, an authorization manager (416) responds to a litigation request that specifies object O1. In response to the request, the authorization manager performs the method of FIG. 3C to modify authorization information of object entries associated with object O1 to specify limited access. The limited access in the example is "read only." In this manner, user U1 only has access to read the data of object O1.

FIG. 4C shows the system at a later point in time (T3), after the litigation request has been serviced (i.e., after the litigation hold has been lifted). The host (400) sends a deletion request to the authorization manager (416) [8]. The deletion request specifies deleting data associated with object O1 that was modified at a point in time after T1 (i.e., any changes made to the Object O1 after T1). The authorization manager (416) uses the object metadata (414C) to identify the chunks to be deleted based on the deletion request [9]. Because the object metadata (414C) specifies data chunks A2' and AP2 to be associated with the object at time T3, the authorization manager prompts data nodes C (420C) and D (420D) to delete the specified chunks (424C, 424D) [10].

Figure 4D:
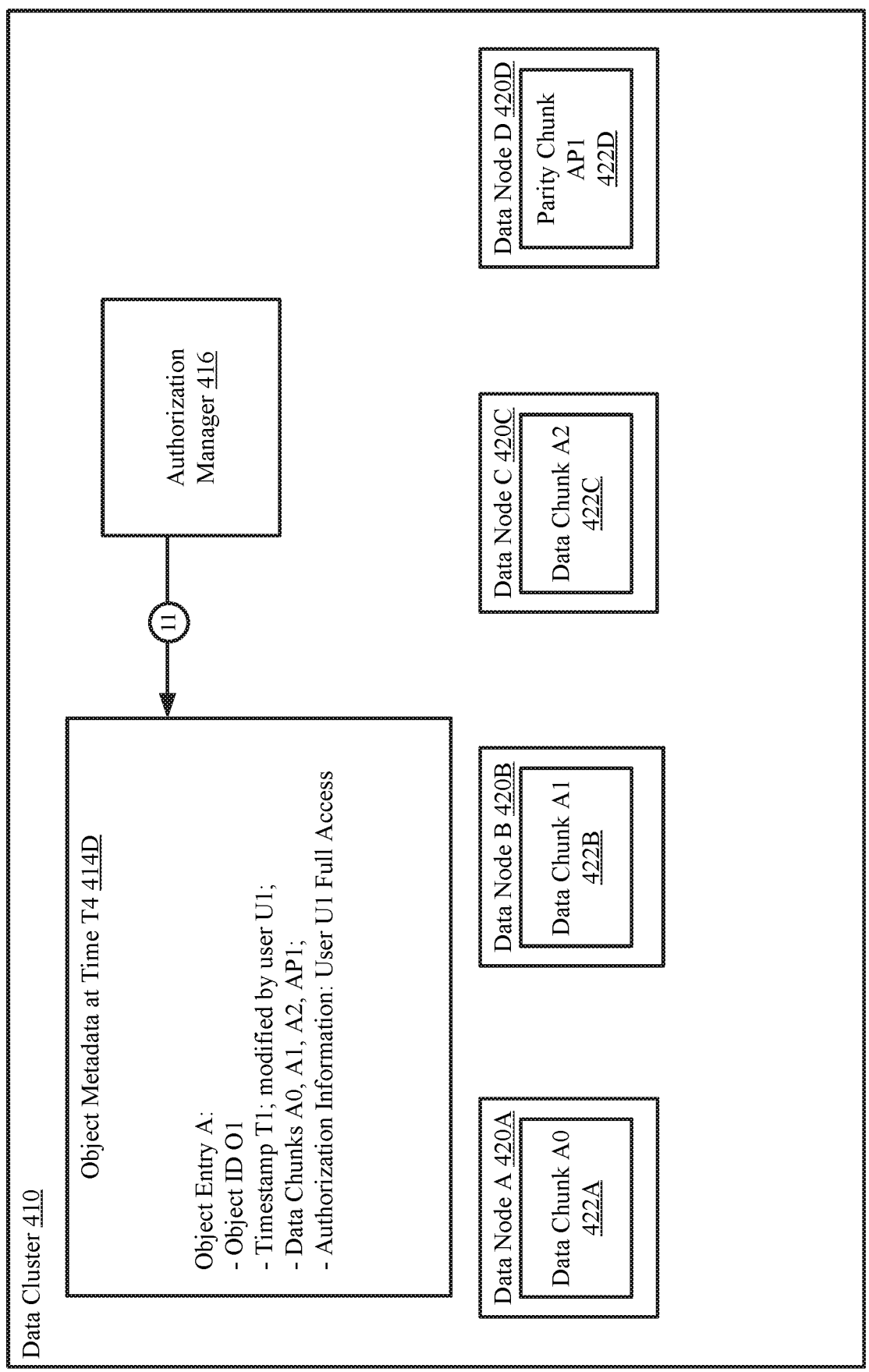

FIG. 4D shows the system at a later point in time (T4) after the deletion request has been serviced. The authorization manager (416) updates the object metadata (414C) by deleting object entry B from the object metadata (414D) and by updating object entry A to allow user U1 to have full access, as was specified prior to the litigation request [11]. Though not shown in FIG. 4D, the storage metadata is also updated to remove any references to data chunks A2' and AP2.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of storing data in a data cluster and managing the data in the event of a litigation request. Embodiments of the invention include storing object metadata that tracks both the association of data with objects and timestamps associated with the generation of the data. Embodiments of the invention further include utilizing the object metadata in the event of a litigation request. The litigation request may involve a legal entity going through a litigation process involving objects stored in the data cluster. Embodiments of the invention include limiting authorization to access the objects while the litigation process is taking place. In this manner, embodiments of the invention improve the efficiency of the litigation process by not allowing further entities to modify the data during the litigation process as well as application of litigation holds on a per-data chunk level without require the host (i.e., the entity that initiated the litigation request) to have any knowledge of the chunks associated with a given object.

Further, embodiments of the invention, by tracking the data associated with the objects and the storage locations of the objects, allow for efficient removal of the data (which may be remove at the chunk level on a per-timestamp basis) when a deletion request associated with the objects are obtained. In this manner, the data cluster is equipped to comply with litigation processes involving legal entities generating data stored in the data cluster.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining data from a host, wherein the data is associated with an object and a user;
applying an erasure coding procedure to the data to obtain a plurality of data chunks and at least one parity chunk;
deduplicating the plurality of data chunks to obtain a plurality of deduplicated data chunks;
generating storage metadata associated with the plurality of deduplicated data chunks and the at least one parity chunk;
generating an object entry based on the plurality of deduplicated data chunks and the at least one parity chunk, wherein the object entry specifies at least the user and authorization information associated with the object for at least the user;
storing the storage metadata and the object entry in an accelerator pool;
storing, across a plurality of fault domains, the plurality of deduplicated data chunks and the at least one parity chunk; and
initiating storage metadata distribution on the storage metadata and the object entry across the plurality of fault domains.

2. The method of claim 1, further comprising:
obtaining a litigation request;
identifying the object entry based on the litigation request; and
modifying the authorization information specified in the object entry to generate modified authorization information.

3. The method of claim 2, further comprising:
obtaining a deletion request after modifying the authorization information;
deleting the plurality of deduplicated data chunks and the at least one parity chunk in response to the deletion request; and
updating the object entry and the storage metadata based on the deletion request.

4. The method of claim 3, wherein the deletion request specifies the object and the user.

5. The method of claim 3, wherein updating the object entry and the storage metadata based on the deletion request comprises:
deleting the storage metadata; and
deleting the object entry.

6. The method of claim 5, wherein updating the object entry and the storage metadata based on the deletion request further comprises:
modifying authorization information of a second object entry associated with the object to permit full access for the second user to the second object entry.

7. The method of claim 2,
wherein the authorization information specifies the user not having access to modify the object and specifies full access for a second user for the object, and
wherein the modified authorization information specifies limited access of the object for the user and the second user.

8. The method of claim 2, wherein the object entry further specifies an object identifier associated with the object, a timestamp, the plurality of data chunks, and the at least one parity chunk.

9. A non-transitory computer readable medium comprising computer readable program code, which when executed by a computer processor enables the computer processor to perform a method for managing data, the method comprising:
obtaining data from a host, wherein the data is associated with an object and a user;
applying an erasure coding procedure to the data to obtain a plurality of data chunks and at least one parity chunk;
deduplicating the plurality of data chunks to obtain a plurality of deduplicated data chunks;
generating storage metadata associated with the plurality of deduplicated data chunks and the at least one parity chunk;
generating an object entry based on the plurality of deduplicated data chunks and the at least one parity chunk, wherein the object entry specifies at least the user and authorization information associated with the object for at least the user;
storing the storage metadata and the object entry in an accelerator pool;
storing, across a plurality of fault domains, the plurality of deduplicated data chunks and the at least one parity chunk; and
initiating storage metadata distribution on the storage metadata and the object entry across the plurality of fault domains.

10. The non-transitory computer readable medium of claim 9, the method further comprising:
obtaining a litigation request;
identifying the object entry based on the litigation request; and
modifying the authorization information specified in the object entry to generate modified authorization information.

11. The non-transitory computer readable medium of claim 10, the method further comprising:
obtaining a deletion request after modifying the authorization information;
deleting the plurality of deduplicated data chunks and the at least one parity chunk in response to the deletion request; and
updating the object entry and the storage metadata based on the deletion request.

12. The non-transitory computer readable medium of claim 11, wherein the deletion request specifies the object and the user.

13. The non-transitory computer readable medium of claim 11, wherein updating the object entry and the storage metadata based on the deletion request comprises:
deleting the storage metadata; and
deleting the object entry.

14. The non-transitory computer readable medium of claim 13, wherein updating the object entry and the storage metadata based on the deletion request further comprises:
modifying authorization information of a second object entry associated with the object to permit full access for the second user to the second object entry.

15. The non-transitory computer readable medium of claim 10,
wherein the authorization information specifies the user not having access to modify the object and specifies full access for a second user for the object, and
wherein the modified authorization information specifies limited access of the object for the user and the second user.

16. The non-transitory computer readable medium of claim 10, wherein the object entry further specifies an object identifier associated with the object, a timestamp, the plurality of data chunks, and the at least one parity chunk.

17. A data cluster, comprising:
a host; and
an accelerator pool comprising a plurality of data nodes, wherein a data node of the plurality of data nodes comprises a processor and memory comprising instructions, which when executed by the processor perform a method, the method comprising:
wherein the data node of the plurality of data nodes is programmed to:
obtain data from a host, wherein the data is associated with an object and a user;
apply an erasure coding procedure to the data to obtain a plurality of data chunks and at least one parity chunk;
deduplicate the plurality of data chunks to obtain a plurality of deduplicated data chunks;
generate storage metadata associated with the plurality of deduplicated data chunks and the at least one parity chunk;
generate an object entry based on the plurality of deduplicated data chunks and the at least one parity chunk, wherein the object entry specifies at least the user and authorization information associated with the object for at least the user;
store the storage metadata and the object entry in an accelerator pool;
store, across a plurality of fault domains, the plurality of deduplicated data chunks and the at least one parity chunk; and
initiate storage metadata distribution on the storage metadata and the object entry across the plurality of fault domains.

18. The data cluster of claim 17, wherein the data node is further programmed to:
obtain a litigation request;
identify the object entry based on the litigation request; and
modify the authorization information specified in the object entry to generate modified authorization information.

19. The data cluster of claim 18, wherein the data node is further programmed to:
obtain a deletion request after modifying the authorization information, wherein the deletion request specifies the object and the user;
delete the plurality of deduplicated data chunks and the at least one parity chunk in response to the deletion request; and
update the object entry and the storage metadata based on the deletion request, wherein updating the object entry and the storage metadata based on the deletion request comprises deleting the storage metadata and deleting the object entry.

20. The data cluster of claim 18,
wherein the authorization information specifies the user not having access to modify the object and specifies full access for a second user for the object, and
wherein the modified authorization information specifies limited access of the object for the user and the second user.

* * * * *